United States Patent
Lee et al.

(10) Patent No.: US 10,303,324 B2
(45) Date of Patent: May 28, 2019

(54) ELECTRONIC DEVICE CONFIGURED TO DISPLAY THREE DIMENSIONAL (3D) VIRTUAL SPACE AND METHOD OF CONTROLLING THE ELECTRONIC DEVICE

(71) Applicant: Samsung Electronics Co., Ltd., Suwon-si (KR)

(72) Inventors: Hee Sae Lee, Yongin-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 14/617,046

(22) Filed: Feb. 9, 2015

(65) Prior Publication Data

US 2015/0227285 A1 Aug. 13, 2015

(30) Foreign Application Priority Data

Feb. 10, 2014 (KR) .................. 10-2014-0014825
Jul. 16, 2014 (KR) .................. 10-2014-0089533

(51) Int. Cl.
  *G06F 3/0486* (2013.01)
  *G06F 3/0481* (2013.01)
  *G06F 3/0488* (2013.01)

(52) U.S. Cl.
  CPC ........ *G06F 3/04817* (2013.01); *G06F 3/0486* (2013.01); *G06F 3/0488* (2013.01); *G06F 3/04815* (2013.01)

(58) Field of Classification Search
  CPC combination set(s) only.
  See application file for complete search history.

(56) References Cited

U.S. PATENT DOCUMENTS

| | | | |
|---|---|---|---|
| 6,230,116 B1 | 5/2001 | Ronen et al. | |
| 6,734,884 B1 | 5/2004 | Berry et al. | |
| 6,938,218 B1* | 8/2005 | Rosen | G06F 3/04815 345/419 |
| 9,086,785 B2* | 7/2015 | Chaudhri | G06F 3/0483 |
| 2002/0015227 A1* | 2/2002 | Hsu | G02B 27/2271 359/462 |
| 2004/0109031 A1* | 6/2004 | Deaton | G06F 3/04815 715/848 |

(Continued)

FOREIGN PATENT DOCUMENTS

| | | |
|---|---|---|
| JP | 2005-108041 A | 4/2005 |
| JP | 2010-238261 A | 10/2010 |

(Continued)

OTHER PUBLICATIONS

"All Wallpapers in Latest Trend "God of Organization" Revolution of Wallpaper," Seoul Newspaper Boom Culture Art Information Magazine, May 22, 2013 (3 pages in English, 3 pages in Korean).

*Primary Examiner* — Hien L Duong
(74) *Attorney, Agent, or Firm* — NSIP Law

(57) ABSTRACT

A method of controlling an electronic device includes displaying a three-dimensional (3D) virtual space comprising at least one 3D object, receiving a correspondence command to make a two-dimensional (2D) icon for executing an application correspond to a first object among the at least one 3D object; and assigning an attribute of the 2D icon to the first object.

23 Claims, 51 Drawing Sheets

(56) References Cited

U.S. PATENT DOCUMENTS

| | | | | |
|---|---|---|---|---|
| 2005/0060653 | A1* | 3/2005 | Fukase | G06F 3/0486 715/724 |
| 2007/0192727 | A1* | 8/2007 | Finley | G06F 3/04815 715/781 |
| 2007/0243905 | A1* | 10/2007 | Juh | G06F 3/038 455/566 |
| 2008/0275794 | A1* | 11/2008 | Ioimo | G06Q 30/02 705/26.1 |
| 2008/0307360 | A1* | 12/2008 | Chaudhri | G06F 3/0481 715/835 |
| 2009/0106680 | A1* | 4/2009 | Brownholtz | G06F 3/0486 715/769 |
| 2009/0122018 | A1* | 5/2009 | Vymenets | G06F 3/04817 345/173 |
| 2009/0228820 | A1* | 9/2009 | Kim | G06F 3/04817 715/769 |
| 2010/0058163 | A1* | 3/2010 | Garcia-Molina | G06F 17/2258 715/220 |
| 2010/0093400 | A1* | 4/2010 | Ju | G06F 3/04817 455/566 |
| 2010/0115471 | A1* | 5/2010 | Louch | G06F 3/04817 715/849 |
| 2010/0229113 | A1* | 9/2010 | Conner | G06Q 10/10 715/771 |
| 2011/0102556 | A1* | 5/2011 | Kim | H04N 1/00307 348/51 |
| 2011/0202884 | A1* | 8/2011 | Li | G06F 3/0488 715/847 |
| 2011/0246950 | A1 | 10/2011 | Luna et al. | |
| 2011/0295915 | A1* | 12/2011 | Ejiri | G06F 17/30132 707/821 |
| 2012/0036433 | A1* | 2/2012 | Zimmer | G06T 15/20 715/702 |
| 2012/0062549 | A1 | 3/2012 | Woo et al. | |
| 2012/0151400 | A1* | 6/2012 | Hong | G06F 3/04817 715/769 |
| 2012/0226662 | A1* | 9/2012 | Swengler | G06F 17/30126 707/634 |
| 2012/0260217 | A1* | 10/2012 | Celebisoy | G06F 3/04815 715/836 |
| 2012/0309463 | A1* | 12/2012 | Lee | G06F 3/0482 455/566 |
| 2013/0194269 | A1* | 8/2013 | Matas | G06T 11/60 345/426 |
| 2013/0222283 | A1* | 8/2013 | Yun | G06F 3/0488 345/173 |
| 2013/0285964 | A1* | 10/2013 | Kang | G06F 3/044 345/173 |
| 2013/0311912 | A1* | 11/2013 | Aso | G06F 13/00 715/762 |
| 2013/0321340 | A1* | 12/2013 | Seo | G06F 1/1641 345/174 |
| 2013/0335335 | A1* | 12/2013 | Neelakant | G06F 3/0486 345/173 |
| 2014/0033048 | A1* | 1/2014 | Kim | G06F 3/0484 715/731 |
| 2014/0068481 | A1* | 3/2014 | O'Connor | G06F 9/4446 715/769 |
| 2014/0208270 | A1* | 7/2014 | Lee | G06F 3/0488 715/835 |
| 2014/0344738 | A1* | 11/2014 | Lai | G06F 3/0482 715/769 |
| 2015/0212691 | A1* | 7/2015 | Wang | G06F 3/0481 715/838 |
| 2015/0348316 | A1* | 12/2015 | Porcino | G06T 7/40 345/426 |

FOREIGN PATENT DOCUMENTS

| | | |
|---|---|---|
| KR | 10-2005-0066546 A | 6/2005 |
| KR | 10-0647958 B1 | 11/2006 |
| KR | 10-0761809 B1 | 9/2007 |
| KR | 10-2009-0122420 A | 11/2009 |
| KR | 10-2009-0122897 A | 12/2009 |
| KR | 10-2011-0038203 A | 4/2011 |
| KR | 10-2011-0044424 A | 4/2011 |
| KR | 10-2011-0048617 A | 5/2011 |
| KR | 10-1233787 B1 | 2/2013 |

* cited by examiner

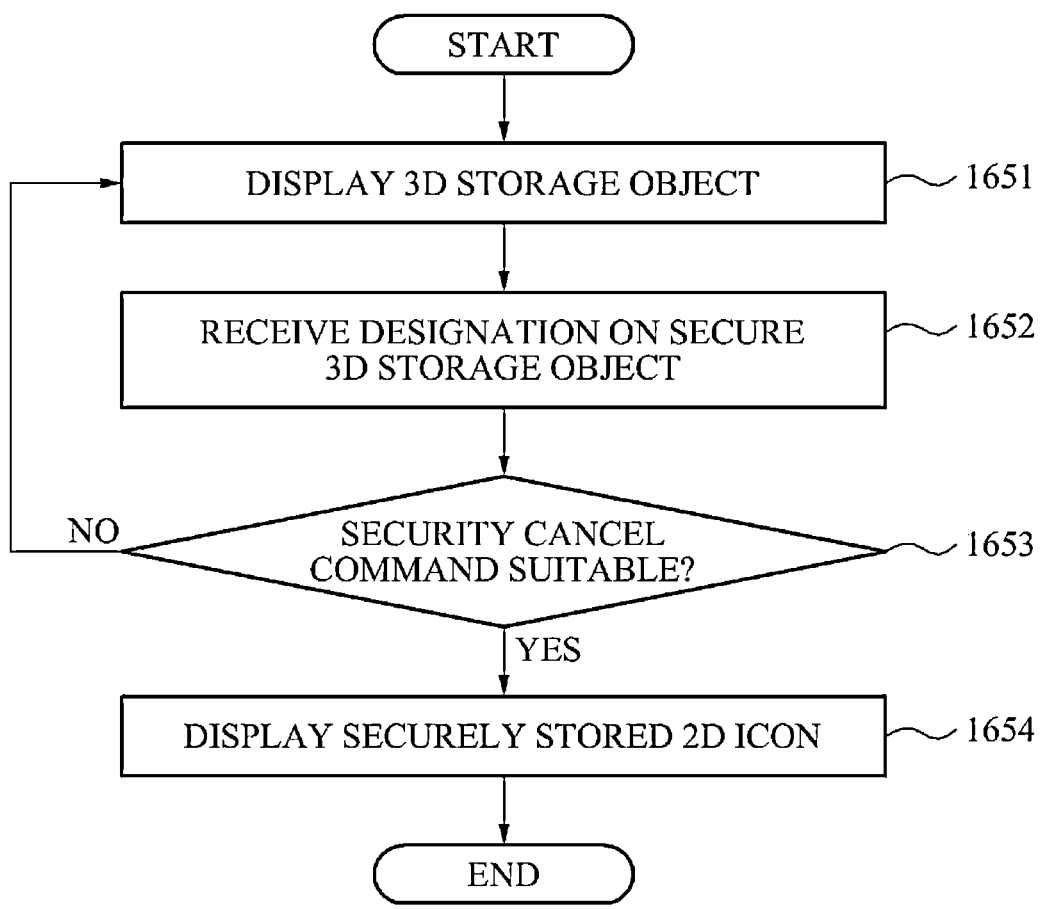

ELECTRONIC DEVICE CONFIGURED TO DISPLAY THREE DIMENSIONAL (3D) VIRTUAL SPACE AND METHOD OF CONTROLLING THE ELECTRONIC DEVICE

CROSS-REFERENCE TO RELATED APPLICATIONS

This application claims the priority benefit of Korean Patent Application No. 10-2014-0014825, filed on Feb. 10, 2014, and Korean Patent Application No. 10-2014-0089533, filed on Jul. 16, 2014, in the Korean Intellectual Property Office, the disclosures of which are incorporated herein by reference.

BACKGROUND

1. Field

The following description relates to an electronic device configured to display a three-dimensional (3D) virtual space and a method of controlling the electronic device, and more particularly, to an electronic device configured to display a 3D virtual space including at least one 3D object and a method of controlling the electronic device.

2. Description of the Related Art

Currently, the demand for mobile electronic devices, such as smartphones and tablet personal computers (PCs), for example, is on increase. A smartphone or a tablet PC refers to an electronic device fabricated in a relatively small size compared to a mobile computer, such as a conventional laptop computer, for example, and may execute a variety of applications, such as basic applications and downloaded applications, for example.

Accordingly, an electronic device may include a launcher application for executing a variety of applications. The launcher application may include an icon capable of executing an application and may have a function of providing at least one icon using a predetermined layout. As for the layout, it is common to arrange at least one icon on a two-dimensional (2D) plane. In addition, when the number of icons exceeds the number of icons capable of being displayed on a single page, the conventional launcher application may set a plurality of pages and arrange icons on each page.

In general, in response to driving of the electronic device or an unlock of a lock-screen set in the electronic device, the launcher application may be displayed on the electronic device and thus, may also be referred to as a wallpaper.

A user may control the electronic device to drive a predetermined application by designating a desired icon from among at least one icon provided from the launcher application.

Here, according to an increase in the number of applications stored in the electronic device, the number of pages of the launcher application for displaying icons may also increase and accordingly, a user may not readily execute a desired application.

SUMMARY

A mobile apparatus may display a 3D virtual space containing 3D objects representing objects routinely found in the 3D virtual space, and the mobile apparatus may also display 2D icons mapped to functions on the mobile apparatus. For example, the 3D virtual space may provide an office environment, the 3D object in the office environment may be a desk telephone, and the 2D icon may be a telephone icon that provides a function of allowing a user to place a telephone call. To further the 3D experience of the user, the 2D icon may be dragged onto the 3D object to map the function of the 2D icon onto the 3D object. Accordingly, in the above example, the user may drag the telephone icon onto the desk telephone, and use the 3D desk telephone in the 3D virtual space to place a telephone call rather than using the 2D telephone icon.

The 3D virtual space may be enhanced in various ways. For example, the drag operation may be enhanced by highlighting the 3D object when the 2D object is dragged onto the 3D object. The 3D object may be animated when the function is executed by the user. For example, the desk telephone may be animated such that the receiver is removed from the base when a call is placed. Additional 3D objects may be displayed to be placed into the 3D virtual space if desired. The 3D object may be manipulated by the user within the 3D virtual space, such as being moved to another location within the 3D virtual space, being rotated within the 3D space, or changing size within the 3D space, for example. The user may zoom a view within the 3D virtual space, or use the 3D virtual space as a lock screen, such that a detected motion within the 3D virtual space unlocks the screen of the mobile apparatus. The lighting within the 3D virtual space may be manipulated to be brighter or dimmer, or to be provided from a different location. The 3D objects may include various visual effects such as shading or blurring, for example. The above examples are provided merely to aid in the understanding of the disclosure, and the disclosure is not limited thereto.

The foregoing and/or other aspects may be achieved by a method of controlling an electronic device, the method including displaying a three-dimensional (3D) virtual space including at least one 3D object, receiving a correspondence command to make a two-dimensional (2D) icon for executing an application and a first object among the at least one 3D object correspond to each other, and assigning an attribute of the 2D icon to the first object.

The method of controlling the electronic device may further include executing an application corresponding to the 2D icon when the first object is designated.

The receiving of the correspondence command may include verifying a correspondence relationship between the 2D icon and the first object, and displaying whether an input of the correspondence command is possible based on the correspondence relationship.

The indicating may include displaying a graphics effect of the first object when the 2D icon corresponds to the first object.

The method of controlling the electronic device may further include displaying an application storage screen including the 2D icon together with the 3D virtual space.

The correspondence command may be a drag-and-drop gesture from the 2D icon included in the application storage screen to the first object.

The method of controlling the electronic device may further include generating at least one user setting area including the at least one 3D object on the 3D virtual space.

The method of controlling the electronic device may further include providing a navigating user interface on the 3D virtual space for setting the at least one user setting area.

The method of controlling the electronic device may further include storing the at least one user setting area in predetermined order.

The method of controlling the electronic device may further include receiving a movement command to move between user setting areas, and moving between user setting areas and displaying each user setting area in response to the movement command and in the predetermined order.

The method of controlling the electronic device may further include editing the at least one 3D object.

The editing of the 3D object may include separating and displaying an addable 3D object from the 3D virtual space, receiving a movement command to a first point on the 3D virtual space from the addable 3D object, and displaying the addable 3D object at the 3D point.

The method of controlling the electronic device may further include receiving a command to adjust a size of the addable 3D object and adjusting and thereby displaying the size of the addable 3D object in response to the command.

The method of controlling the electronic device may further include distinguishing and thereby displaying a 3D object that has established a correspondence relationship with the 2D icon from another 3D object that has not established the correspondence relationship with the 2D icon, among the at least one 3D object.

The method of controlling the electronic device may further include displaying an identifier of the 2D icon to correspond to the 3D object that has established the correspondence relationship with the 2D icon, among the at least one 3D object.

The method of controlling the electronic device may further include setting a lock screen for the 3D virtual space, receiving a lock screen unlocking command corresponding to a predetermined 3D object, and unlocking the lock screen in response to the lock screen unlocking command.

One of the at least one 3D object may be a secure 3D storage object in which at least one 2D icon is securely stored.

The method of controlling the electronic device may further include displaying a security cancel user interface when the secure 3D storage object is designated, and displaying the securely stored at least one 2D icon in response to a security cancel command that is input using the security cancel user interface.

The foregoing and/or other aspects may be achieved by an electronic device including a display unit configured to display a 3D virtual space including at least one 3D object, an input unit configured to receive a correspondence command to make a 2D icon for executing an application correspond to a first object among the at least one 3D object, and a controller configured to assign an attribute of the 2D icon to the first object.

The controller may execute an application corresponding to the 2D icon when the first object is designated.

The display unit may provide a navigating user interface on the 3D virtual space for setting at least one user setting area including at least one 3D object. The input unit may receive a setting command to set the at least one user setting area. The controller may control the set at least one user setting area to be stored in predetermined order.

When the input unit receives a movement command to move between user setting areas, the controller may control the display unit to move between user setting areas and display each user setting area in response to the movement command and in the predetermined order.

The foregoing and/or other aspects may be achieved by a method of controlling an electronic device, the method including displaying a first menu screen including a first wallpaper and at least one first icon, receiving a screen switch command instructing to switch a menu screen from the first menu screen to a second menu screen, and displaying the second menu screen including at least one second icon and a second wallpaper acquired by processing a first visual effect on the first wallpaper.

The first visual effect may be an effect of displaying the first wallpaper to be relatively dark or an effect of blurring the first wallpaper.

The method of controlling the electronic device may further include switching the second wallpaper to the first wallpaper and displaying the second menu screen including the at least one second icon and the first wallpaper, when the screen switch command is completed.

The method of controlling the electronic device may further include processing a second visual effect on the at least one first icon and displaying a result of the second visual effect when the screen switch command is input.

The second visual effect may be a spotlight effect on the at least one first icon and an effect of blurring at least a portion of the at least one first icon.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 16A is a flowchart illustrating a method for secure storage according to example embodiments.

DETAILED DESCRIPTION

Figure 1:
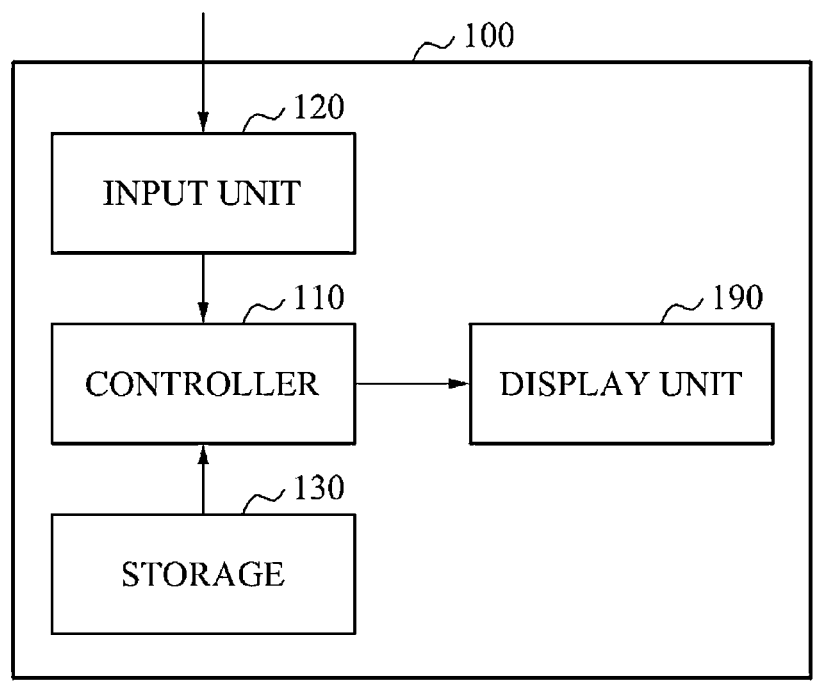
FIG. 1 is a block diagram illustrating an electronic device according to example embodiments.

Reference will now be made in detail to embodiments, examples of which are illustrated in the accompanying drawings, wherein like reference numerals refer to like elements throughout. Example embodiments are described below to explain the present disclosure by referring to the figures, however, the present disclosure is not limited to the example embodiments or restricted thereby.

FIG. 1 is a block diagram illustrating an electronic device 100 according to example embodiments.

Referring to FIG. 1, the electronic device 100 may include a controller 110, an input unit 120, a storage 130, and a display unit 190.

The controller 110 may include a central processing unit (CPU), read only memory (ROM) configured to store a control program used for control of the electronic device 100, and read access memory (RAM) configured to read a signal or data input from an outside of the electronic device 100 or used as a storage area for a work performed at the electronic device 100. The CPU may include a single core, a dual core, a triple core, or a quad core. CPU, ROM, and RAM may be connected to one another via an internal bus.

The controller 110 may control the input unit 120, the storage 130, and the display unit 190.

The controller 110 may control a three-dimensional (3D) virtual space to be displayed. The controller 110 may control a two-dimensional (2D) icon to correspond to a single 3D object on the 3D virtual space, which will be further described.

The input unit 120 may receive a correspondence command to make a 2D icon and a 3D object correspond to each other. For example, the input unit 120 may receive a drag-and-drop gesture from the 2D icon to the 3D object. The input unit 120 may convert the received correspondence command to an electrical signal and may transfer the electrical signal to the controller 110.

The input unit 120 may be configured as input hardware including a keypad. Alternatively, the input unit 120 may also be configured as a touch screen panel integrated with the display unit 190. In the case of configuring the input unit 120 as the touch screen panel, the input unit 120 may be configured as various types of touch screen panels, such as a capacitive touch screen panel, a resistive touch screen panel, and an electromagnetic resonance (EMR) touch screen, for example, and thus, a type thereof is not limited.

The input unit 120 may receive a navigating command to navigate the 3D virtual space. Alternatively, the input unit 120 may also receive a setting command to set at least one user setting area including at least one 3D object on the 3D virtual space. The input unit 120 may also receive a movement command to move between user setting areas.

The storage 130 may store at least one piece of information. The storage 130 may include a nonvolatile memory, a volatile memory, a hard disk drive (HDD), or a solid state drive (SDD), for example.

The storage 130 may store 3D virtual space information. For example, the 3D virtual space may include at least one 3D object. 3D coordinates may be set for each 3D object. The storage 130 may store a 3D object and 3D coordinates of the 3D object.

Alternatively, the storage 130 may store at least one application. The storage 130 may store a launcher application for executing the at least one application. The launcher application refers to an application for executing an application stored in the storage 130, and may store an icon corresponding to each application.

The display unit 190 may visually display graphics data. The display unit 190 may display graphics data using a variety of methods, such as a liquid crystal display (LCD) method and a light emitting diode (LED) method, for example.

The display unit 190 may display a 3D virtual space. Alternatively, when a single 3D object is designated on the 3D virtual space, the display unit 190 may display an application execution screen associated with the 3D object or an application related function.

The display unit 190 may display a navigating screen of the 3D virtual space, and may also display an application storage and an addable 3D object.

When the display unit 190 displays the 3D virtual space including at least one 3D object, the input unit 120 may receive a correspondence command to make a 2D icon for executing an application and a first object among the at least one 3D object correspond to each other.

In this example, the controller 110 may assign an attribute of the 2D icon to the first object in response to the correspondence command. An icon attribute may be a corresponding application execution or a corresponding application related function. In detail, when the attribute of the 2D icon is assigned to the first object, the first object may perform the same functionality as the 2D icon.

In an example in which a 2D icon is designated and includes a function of executing an application, the application may be executed in response to designating a first object that is assigned with an attribute of the 2D icon. Alternatively, in an example in which a 2D icon is designated and an application related function is to be output, the application related function may be output in response to designating a first object that is assigned with an attribute of the 2D icon. The 2D icon may refer to an icon capable of executing the application and may also refer to a widget for outputting the application related function.

When the first object is designated by the input unit 120, the controller 110 may control an application corresponding to the 2D icon to be executed.

The display unit 190 may provide a 3D space navigating user interface for setting at least one user setting area including at least one 3D object. The input unit 120 may receive a setting command to set at least one user setting area, and the controller 110 may control the set at least one user setting area to be stored in predetermined order.

In this example, in response to a movement command to move between the set user setting that is received by the input unit 120, the controller 110 may control the display unit 190 to move and thereby display each user setting area based on the predetermined order.

Figure 2:
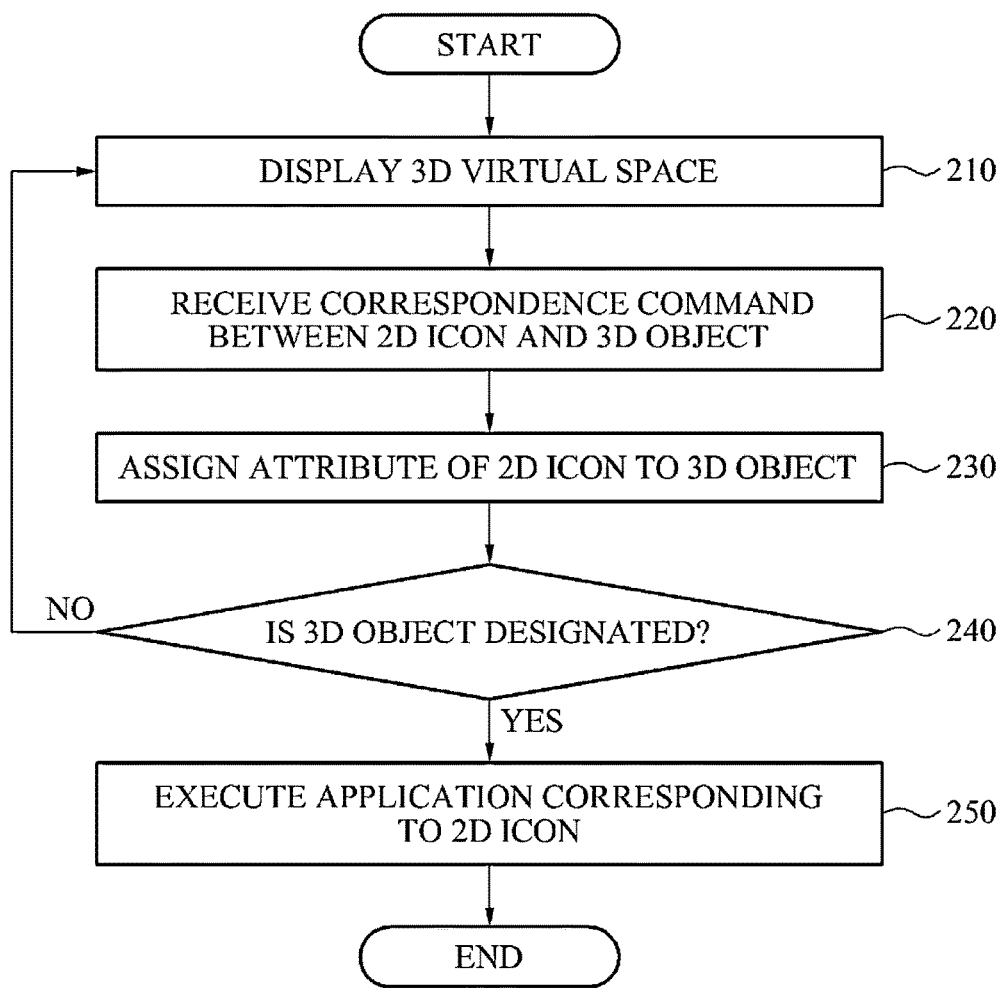
FIG. 2 is a flowchart illustrating a method of controlling an electronic device according to example embodiments.

FIG. 2 is a flowchart illustrating a method of controlling an electronic device according to example embodiments.

In operation 210, the electronic device may display a 3D virtual space. The 3D virtual space may include at least one 3D object.

Figure 3:
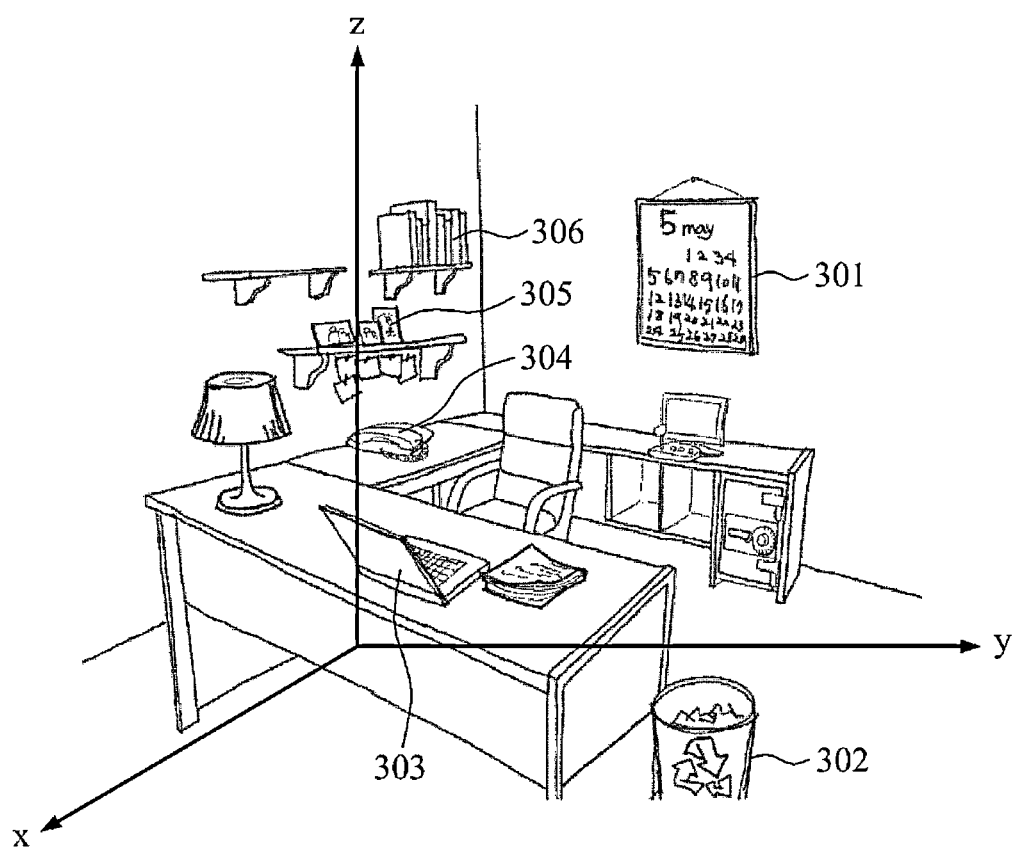
FIG. 3 illustrates an example of a three-dimensional (3D) virtual space according to example embodiments.

FIG. 3 illustrates an example of a 3D virtual space according to example embodiments. The 3D virtual space may be defined in a 3D coordinate system of xyz, and may include at least one 3D object, such as 3D objects 301, 302, 303, 304, 305, and 306, for example.

Each of the 3D objects 301, 302, 303, 304, 305, and 306 may have 3D coordinates of xyz, and may have a predetermined shape. For example, referring to FIG. 3, the 3D objects 301, 302, 303, 304, 305, and 306 may have shapes of a calendar, a dustbin, a laptop computer, a telephone, a photo frame, and a book, respectively. The shapes of the 3D objects 301, 302, 303, 304, 305, and 306 may be defined as 3D coordinates. Accordingly, when an observation viewpoint for the 3D virtual space is changed, the viewed shapes of the 3D objects 301, 302, 303, 304, 305, and 306 may also be changed.

The 3D virtual space enables a user to easily find a predetermined object based on a correlation between objects. For example, when a user desires to find a laptop computer object, for example, the 3D object 303, the user may remember that the laptop computer object is disposed on a desk object and may readily find the laptop computer object, for example, the 3D object 303. In addition, the user may edit a position of a 3D object and the search readability for a predetermined object may be further enhanced.

Referring again to FIG. 2, in operation 220, the electronic device may receive a correspondence command between a 2D icon and a 3D object. For example, the user may input a drag-and-drop gesture from a 2D icon to a 3D object. The electronic device may recognize the drag-and-drop gesture as a correspondence command, and may verify the 2D object and the 3D object based on a start point and an end point of the drag-and-drop gesture.

In operation 230, the electronic device may assign an attribute of the 2D icon to the 3D object. For example, the electronic device enables the 3D object to perform a functionality of the 2D icon by assigning the attribute of the 2D icon to the 3D object. As described above, the 2D icon may refer to an icon configured to execute an application or to output an application related function. The 3D object assigned with the attribute of the 2D icon may execute the application or output the application related function.

In operation 240, the electronic device may determine whether the 3D object is designated. For example, the electronic device may display the 3D virtual space and the user may designate a 3D object on the 3D virtual space.

When the 3D object is designated, the electronic device may execute an application corresponding to the 2D icon in operation 250. Alternatively, the electronic device may output an application related function corresponding to the 2D icon.

Figure 4:
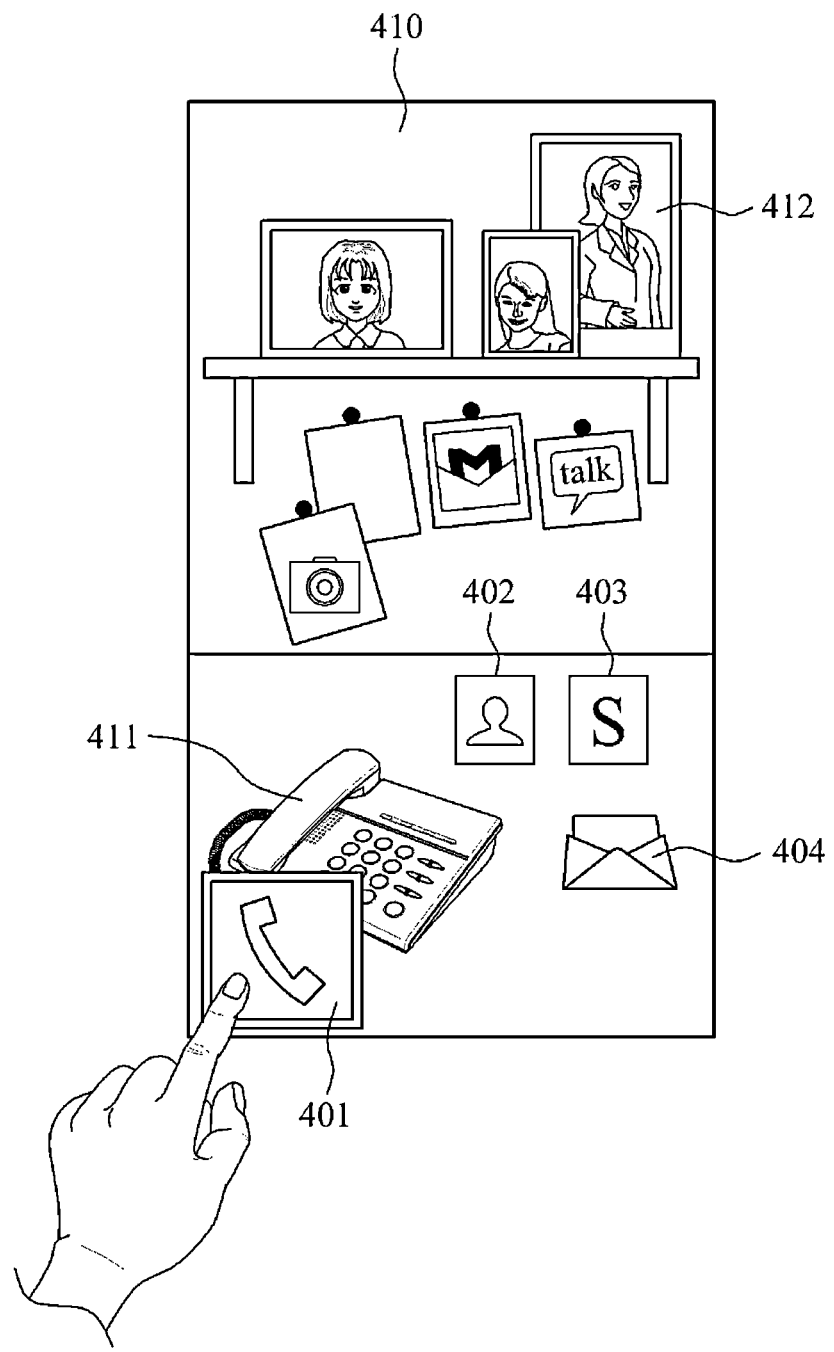
FIG. 4 illustrates an example to describe a correspondence command according to example embodiments.

FIG. 4 illustrates an example to describe a correspondence command according to example embodiments.

Referring to FIG. 4, the electronic device may display 2D icons 401, 402, 403, and 404, and 3D objects 411 and 412 on a 3D virtual space 410.

A user may input a gesture of overlapping the 2D icon 401 on one of the 3D objects 411 and 412, for example, the 3D object 411. The gesture of overlapping the 2D icon 401 and the 3D object 411 may be predetermined as a correspondence command.

When the correspondence command between the 2D icon 401 and the 3D object 411 is input, displaying of the 2D icon 401 may be suspended. An attribute, or function, of the 2D icon 401 may be assigned to the 3D object 411. The 2D icon 401 refers to an icon corresponding to a telephone application and thus, the telephone application may be executed in response to designating the 2D icon 401. Accordingly, in response to designating the 3D object 411, the telephone application may be executed.

Figure 5A:
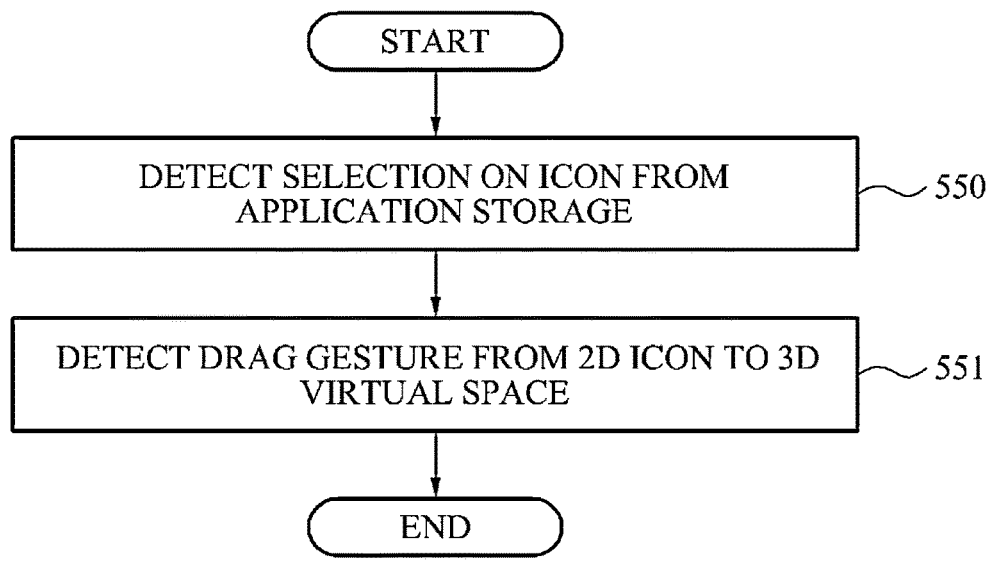
FIGS. 5A, 5C, 5E, and 5G are flowcharts illustrating a method of controlling an electronic device according to example embodiments.
Figure 5B:
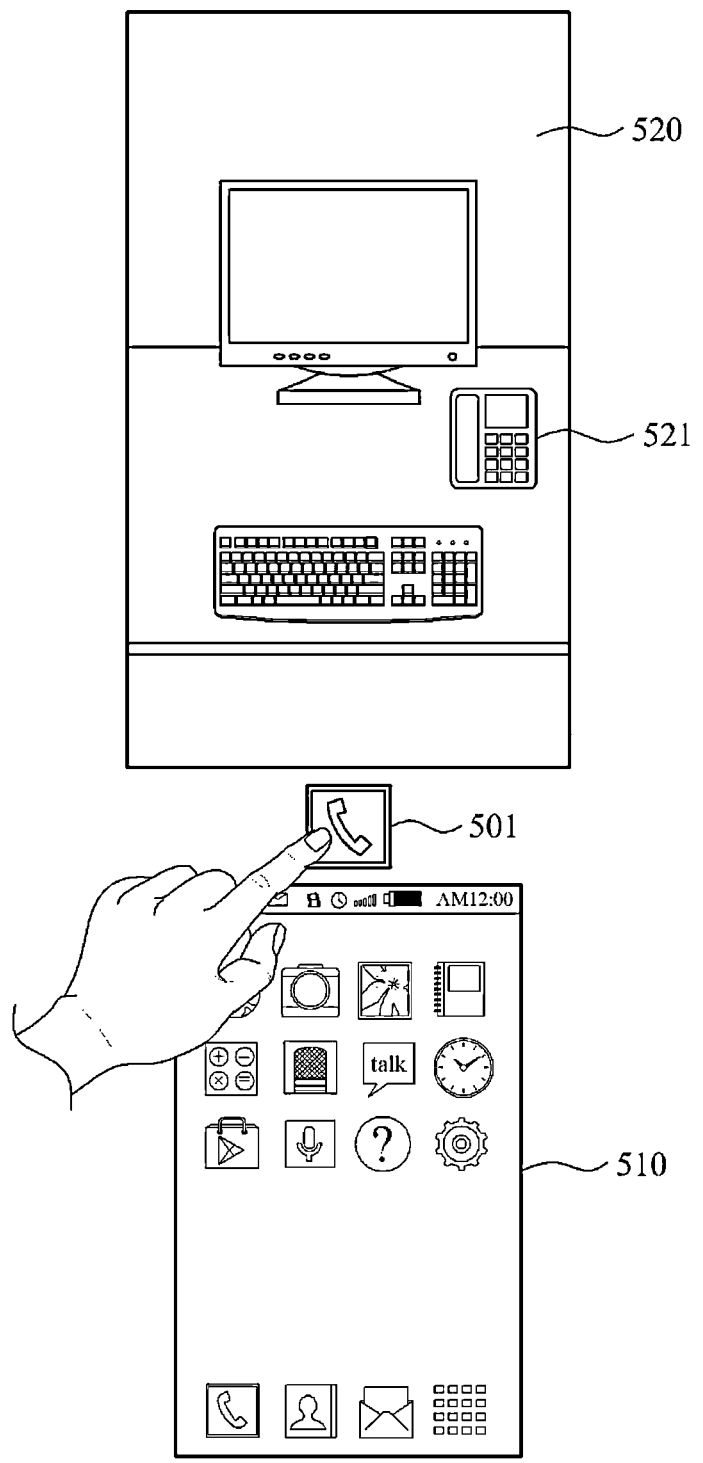
FIGS. 5B, 5D, 5F, and 5H illustrate examples of a screen of an electronic device according to example embodiments.

FIG. 5A is a flowchart illustrating a method of controlling an electronic device according to example embodiments, and FIG. 5B illustrates an example of a screen of an electronic device according to example embodiments.

Referring to FIG. 5A, in operation 550, the electronic device may detect a selection on an icon from an application storage.

In operation 551, the electronic device may detect a drag gesture from a 2D icon to a 3D virtual space.

Referring to FIG. 5B, the electronic device may display an application storage screen 510 including a 2D icon together with a 3D virtual space 520. At least one 2D icon may be arranged as a predetermined layout and display on the application storage screen 510.

A user may input a drag gesture from a single 2D icon 501 of the application storage screen 510. A position of the 2D icon 501 may be changed and displayed in response to the drag gesture. For example, the user may maintain a touch with an input unit of the electronic device while inputting the drag gesture and a controller of the electronic device may control the 2D icon 501 to be moved and displayed in correspondence to a point at which the touch with the input unit continues.

Figure 5C:
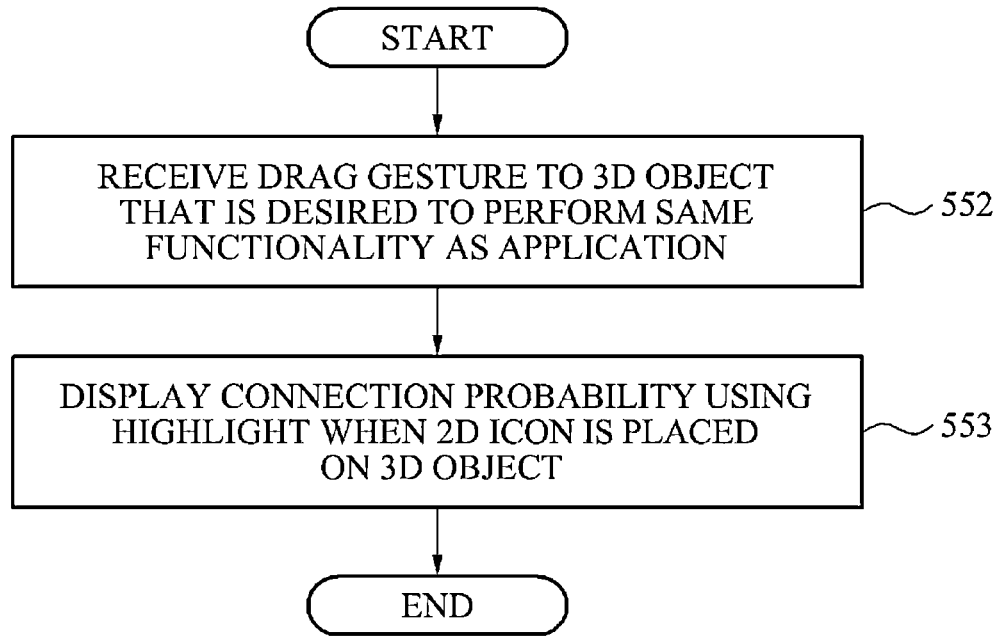
Figure 5D:
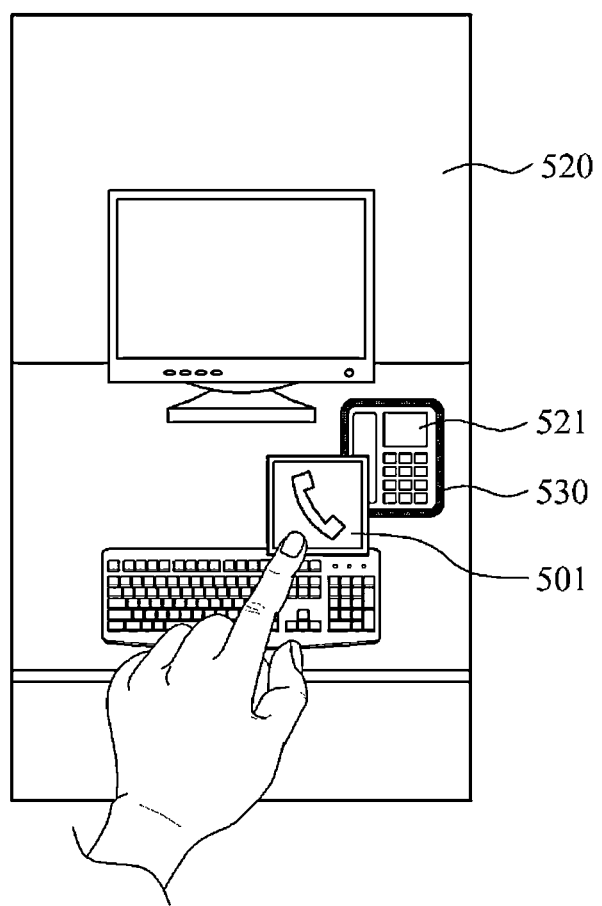

FIG. 5C is a flowchart illustrating a method of controlling an electronic device according to example embodiments, and FIG. 5D illustrates an example of a screen of an electronic device according to example embodiments.

In operation 552, the electronic device may receive a drag gesture to a 3D object that is desired to perform the same functionality as an application. In operation 553, the electronic device may display a connection probability including a highlight when a 2D icon is placed on the 3D object.

Referring to FIG. 5D, a user may manipulate the electronic device to drag the 2D icon 501 towards a 3D object 521. The controller of the electronic device may determine that the 2D icon 501 and the 3D object 521 overlap and may verify a correspondence relationship therebetween. For example, referring to FIG. 5D, the 2D icon 501 corresponding to a telephone application overlaps the 3D object 521 in a shape of a telephone. The controller may verify a predetermined correspondence relationship therebetween and may control whether an input correspondence command is possible to be displayed.

In an example in which the 2D icon 501 corresponds to the 3D object 521, the controller may control a graphics effect for the 3D object 521 in which the above correspondence relationship is applied to be output. Referring to FIG. 5D, a highlight 530 may be displayed around the 3D object 521. As described above, the user may verify whether a 2D icon and a 3D object corresponding to a correspondence command correspond to each other.

In an example in which the 2D icon does not correspond to the 3D object, the controller may control a graphics effect in which the above correspondence relationship is applied to be output. Alternatively, the controller may control the highlight 530 not to be displayed.

An example in which a predetermined attribute is assigned to each 3D object and accordingly, a correspondence relationship with a 2D icon is determined by the controller is described. However, it is only an example and thus, an attribute may not be assigned to a 3D object. In this example, the 3D object may not correspond to any 2D icon, which may be easily understood by those skilled in the art.

Figure 5E:
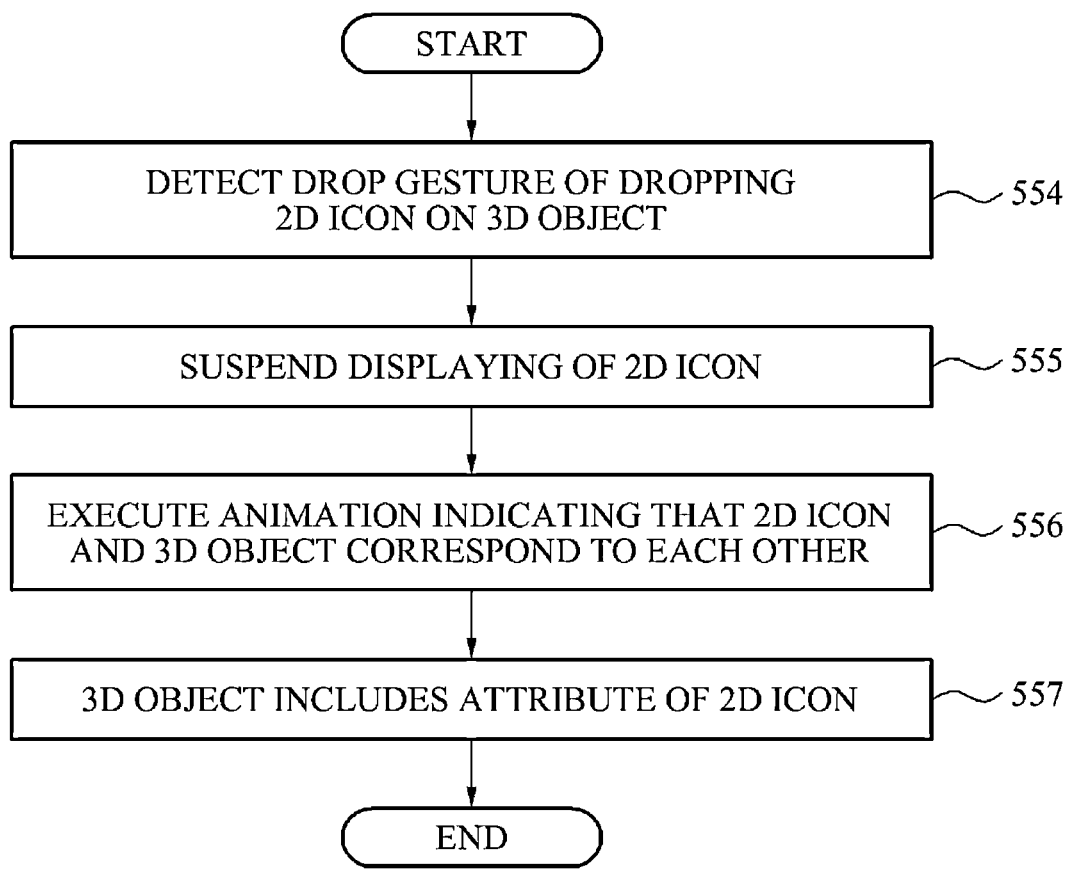
Figure 5F:
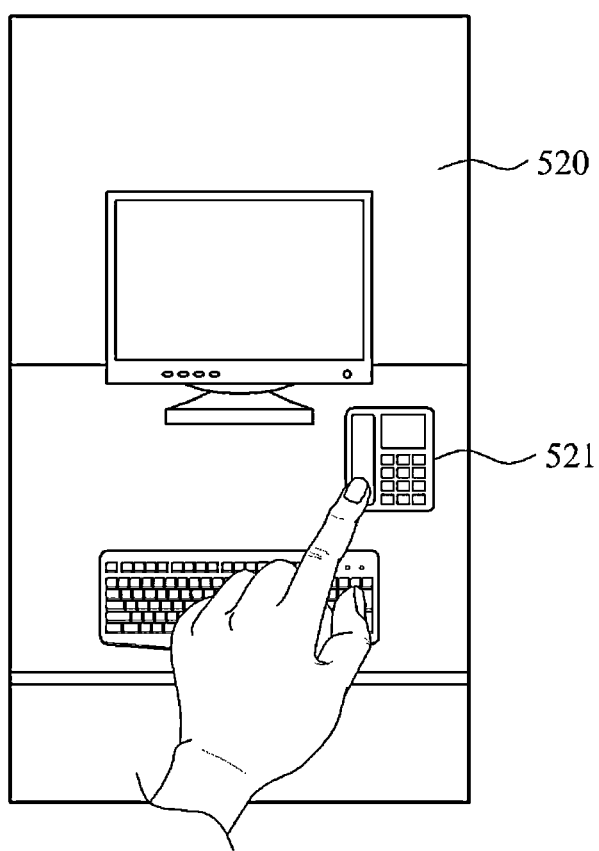

FIG. 5E is a flowchart illustrating a method of controlling an electronic device according to example embodiments, and FIG. 5F illustrates an example of a screen of an electronic device according to example embodiments.

Referring to FIG. 5E, in operation 554, the electronic device may detect a drop gesture of dropping a 2D icon object on a 3D object. For example, the electronic device may detect a drop gesture of a 2D icon object by detecting a release of continuous touch starting from a 2D icon.

In operation 555, the electronic device may suspend displaying of the 2D icon.

In operation 556, the electronic device may execute an animation indicating that the 2D icon and the 3D object correspond to each other.

In operation 557, the 3D object may include an attribute of the 2D icon.

Referring to FIG. 5F, a user may input a drop gesture of dropping a 2D icon object on a 3D object. The controller may detect the drop gesture in response to detecting a release of continuous touch. It can be verified from FIG. 5F that the 2D icon 501 of FIG. 5D is not displayed anymore. The controller may suspend displaying of the 2D icon 501 in response to detecting the drop gesture. The controller may determine that a correspondence command of a drag-and-drop gesture is input, based on detection of the drop gesture. In response to the input correspondence command, the controller may assign an attribute of the 2D icon 501 to the 3D object 521.

Figure 5G:
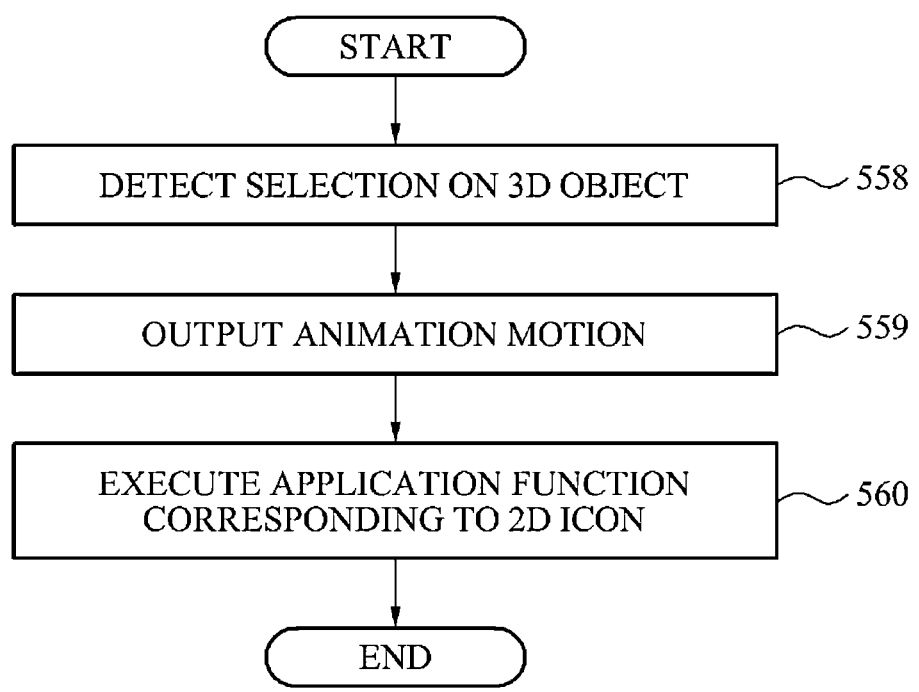
Figure 5H:
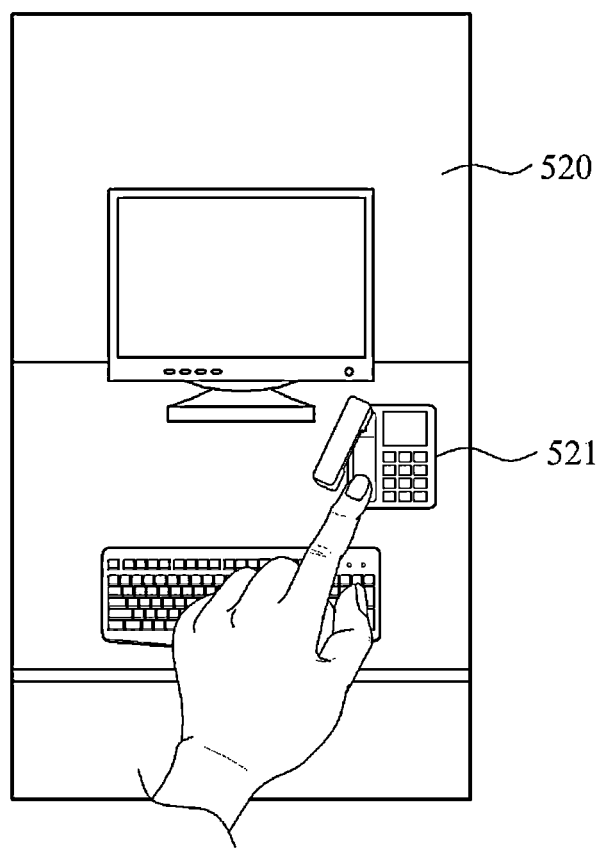

FIG. 5G is a flowchart illustrating a method of controlling an electronic device according to example embodiments, and FIG. 5H illustrates an example of a screen of an electronic device according to example embodiments.

Referring to FIGS. 5G and 5H, in operation 558, the electronic device may detect a selection on the 3D object 521 to which an attribute of the 2D icon 501 is assigned.

In operation 559, the controller may output an animation motion, such as lifting a receiver of the 3D object 521 corresponding to a telephone object, for example.

In operation 560, the controller may output the attribute of the 2D icon 501. For example, the controller may execute a telephone application that is a function of the 2D icon 501.

Figure 6:
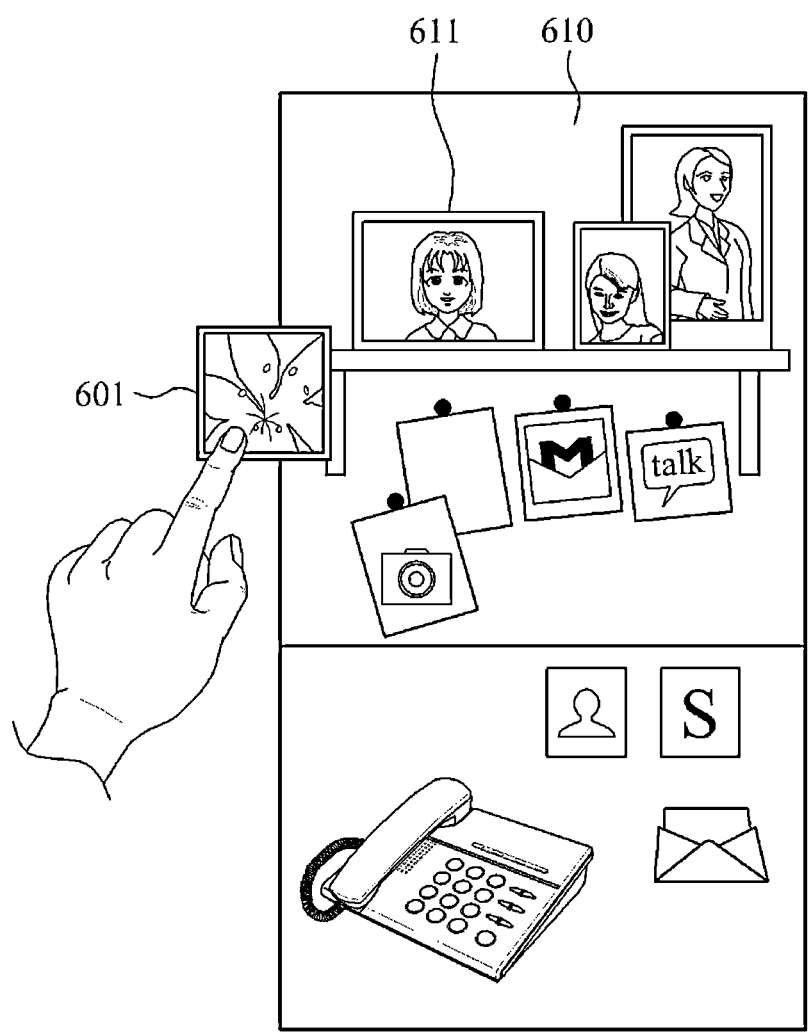
FIG. 6 illustrates an example to describe a 3D object according to example embodiments.

FIG. 6 illustrates an example to describe a 3D object according to example embodiments.

Referring to FIG. 6, a user may input a drag-and-drop gesture from a 2D gallery icon 601 to a 3D frame object 611 on a 3D virtual space 610.

In response to the drag-and-drop gesture, a controller of an electronic device may assign an attribute of the 2D gallery icon 601 to the 3D frame object 611. The controller may control a shape of the 3D frame object 611 to be changed and displayed so that the user may easily identify that the attribute of the 2D gallery icon 601 is assigned to the 3D frame object 611. For example, it can be seen that a picture is displayed in the 3D frame object 611. The picture may be a picture stored in a gallery application corresponding to the 2D gallery icon 601. Accordingly, the user may identify that the attribute of the 2D gallery icon 601 is assigned to the 3D frame object 611. The user may preview a gallery application through the 3D frame object 611. For example, even before the user designates the 3D frame object 611, the 3D frame object 611 may execute an application function.

As described above, when an attribute of a 2D icon is assigned to a 3D object, the controller may indicate that the attribute of the 2D icon is assigned by changing a shape of the 3D object.

Figure 7:
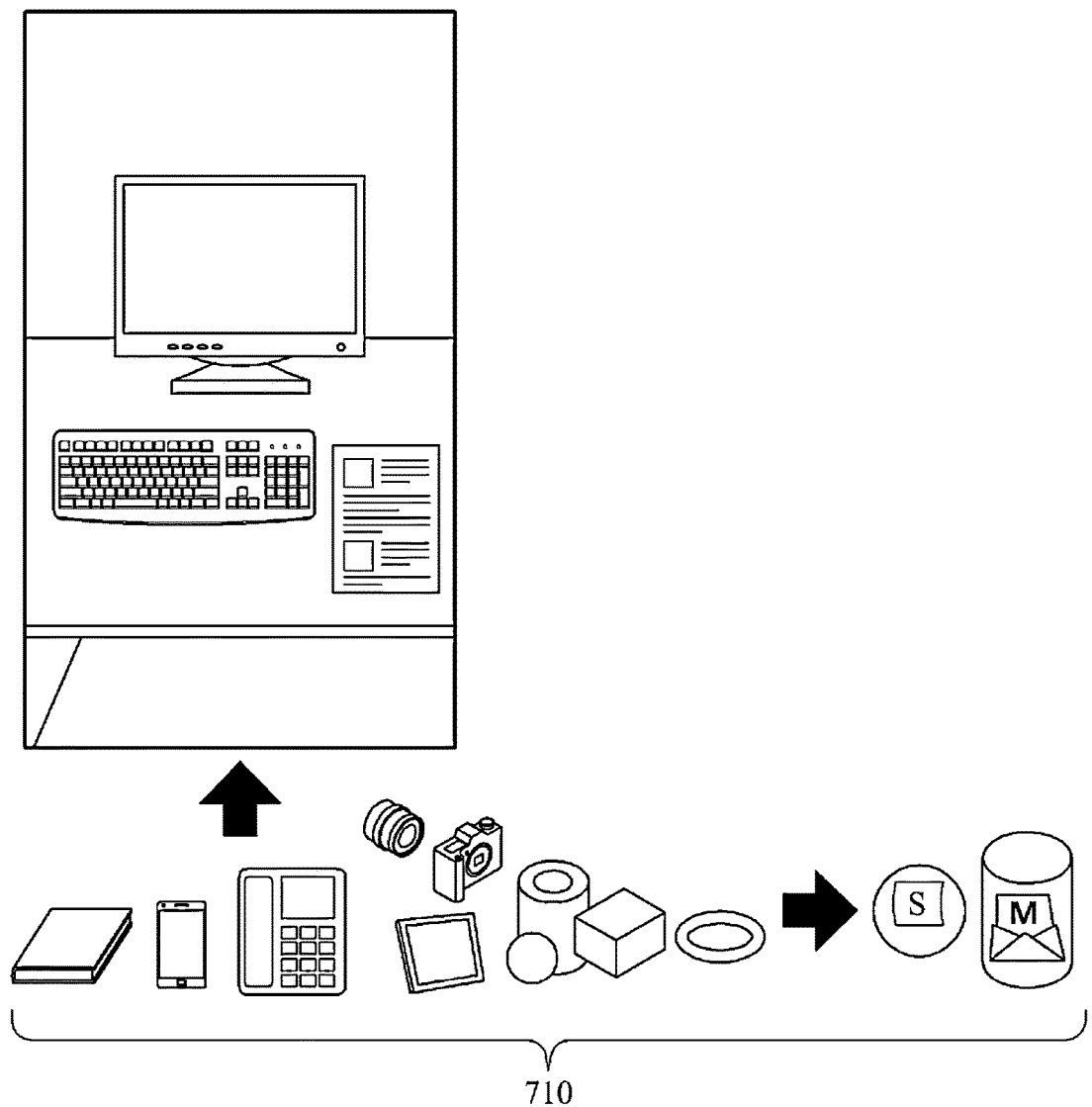
FIG. 7 illustrates an example of adding a 3D object according to example embodiments.

FIG. 7 illustrates an example of adding a 3D object according to example embodiments.

Referring to FIG. 7, the electronic device may store addable 3D objects 710. In response to an edition command input from a user, a controller of an electronic device may dispose each of the addable 3D objects 710 at a point of a 3D virtual space. The addable 3D objects 710 may include an object to which an attribute of a 2D icon is not assigned, or may include an object to which a predetermined unique attribute is assigned. Hereinafter, adding a 3D object will be further described.

Figure 8A:
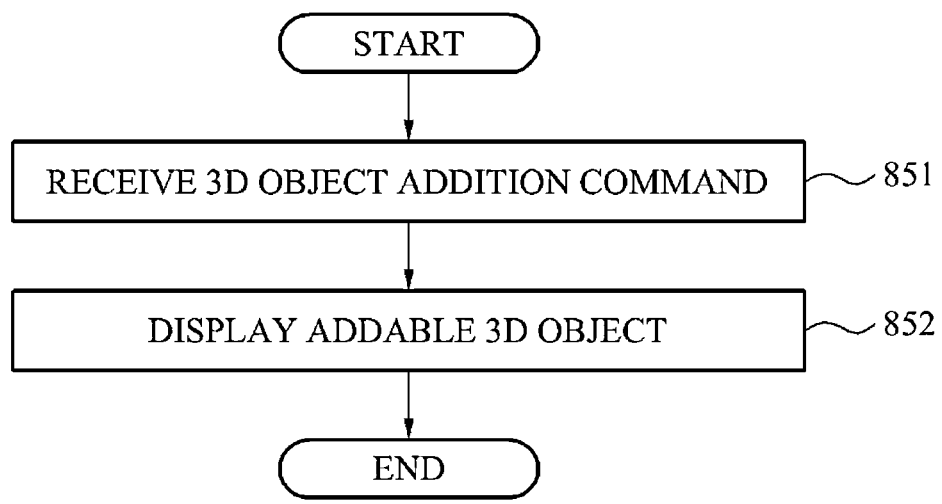
FIGS. 8A, 8C, and 8E are flowcharts illustrating a method of controlling an electronic device according to example embodiments.
Figure 8B:
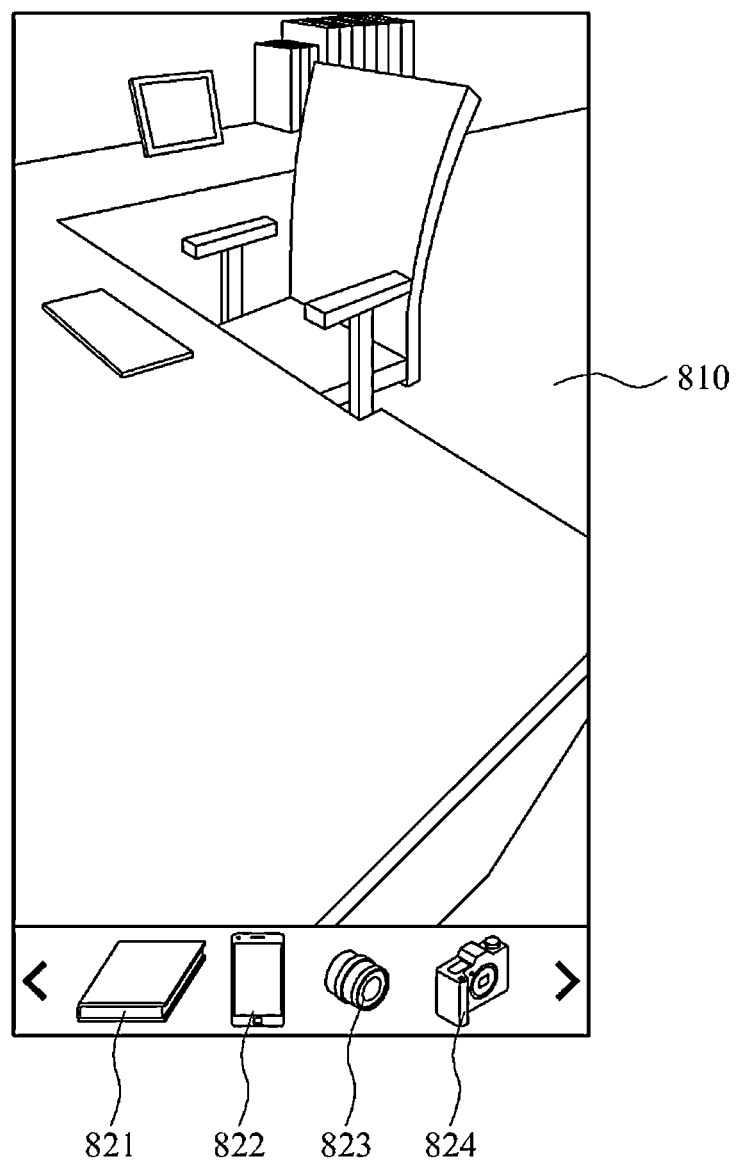
FIGS. 8B, 8D, and 8F illustrate examples of a screen of an electronic device according to example embodiments.

FIG. 8A is a flowchart illustrating a method of controlling an electronic device according to example embodiments, and FIG. 8B illustrates an example of a screen of an electronic device according to example embodiments.

Referring to FIG. 8A, in operation 851, the electronic device may receive a 3D object addition command.

In operation 852, a controller of the electronic device may display an addable 3D object.

The controller may provide a user interface that enables a user to edit a 3D object on a 3D virtual space 810 of FIG. 8, such as addition, a size change, deletion, and a name change of the 3D object, for example. The controller may perform an edition in response to a 3D object addition command, a 3D object size change command, a 3D object deletion command, and a 3D object name change command.

Referring to FIG. 8B, the controller may display a list of addable 3D objects 821, 822, 823, and 824 in a predetermined area, for example, at a lower end of the 3D virtual space 810.

Figure 8C:
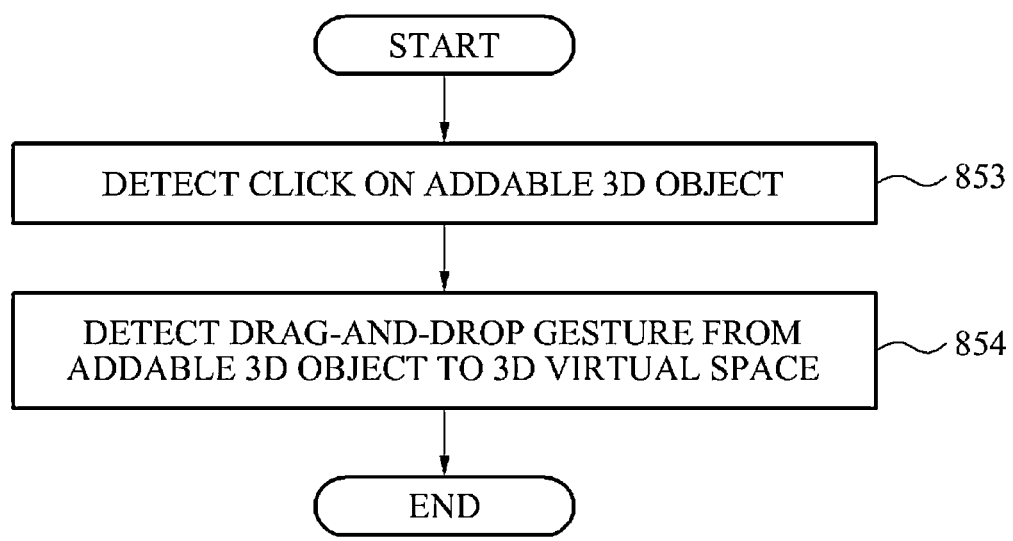
Figure 8D:
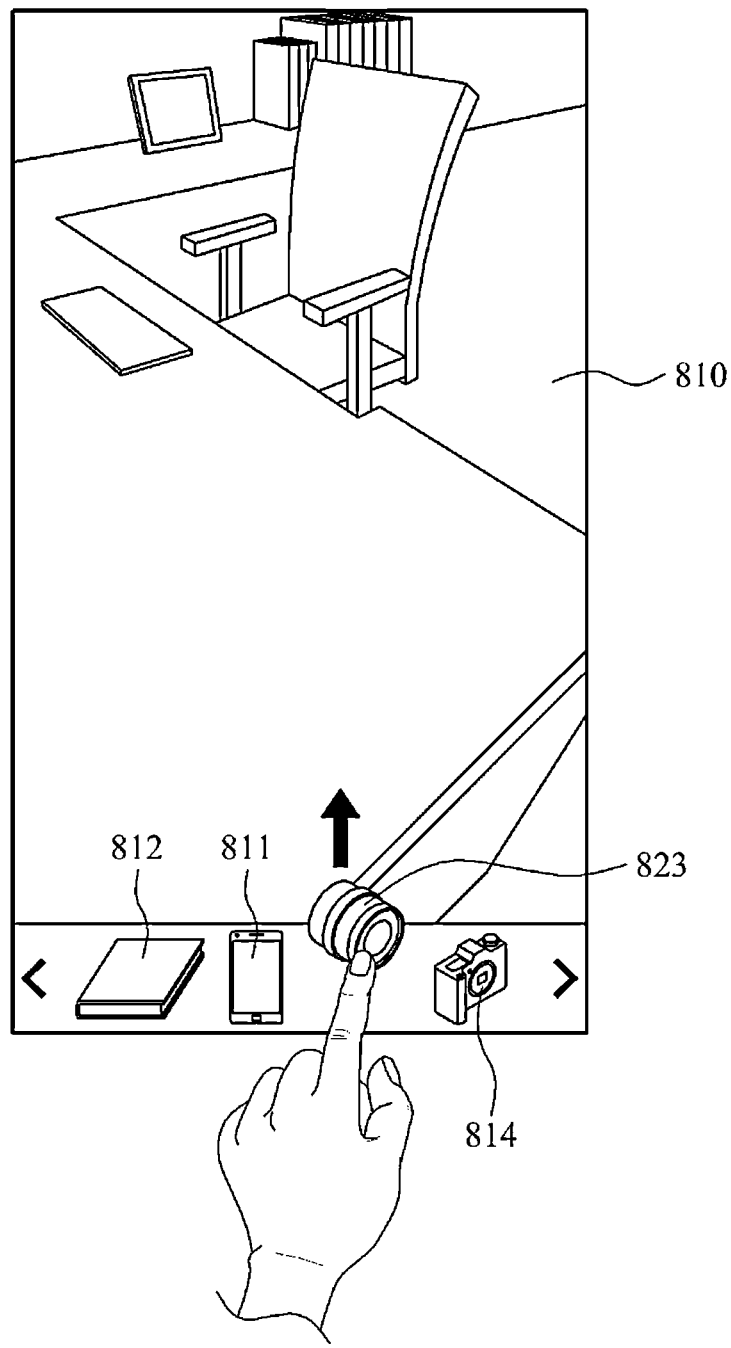

FIG. 8C is a flowchart illustrating a method of controlling an electronic device according to example embodiments, and FIG. 8D illustrates an example of a screen of an electronic device according to example embodiments.

Referring to FIG. 8C, in operation 853, the controller may detect a click of a user on an addable 3D object.

In operation 854, the controller may detect a drag-and-drop gesture that starts from the addable 3D object and towards a point of a 3D virtual space. For example, the controller may detect the drag-and-drop gesture by detecting a start point and an end point of continuous touch input to an input unit of the electronic device.

Referring to FIG. 8D, the user may click on an addable 3D object 823 from a list of addable objects 812, 811, 823, and 814, and may input a drag gesture. The controller may detect the drag gesture based on the continuous touch detected by the input unit. In response to the drag gesture, the controller may control the addable 3D object 823 to be moved and displayed at a touch point of the user.

The controller may detect a drop gesture at a point of the 3D virtual space 810 and may control the addable 3D object 823 to be displayed at the point of the 3D virtual space 810. The newly added 3D object 823 is in a state in which the 3D object 823 does not correspond to a 2D icon. Accordingly, an attribute of the 2D icon may be assigned to the 3D object 823 by executing a correspondence command described above with reference to FIG. 2.

Alternatively, the newly added 3D object 823 may have a predetermined unique attribute.

Figure 8E:
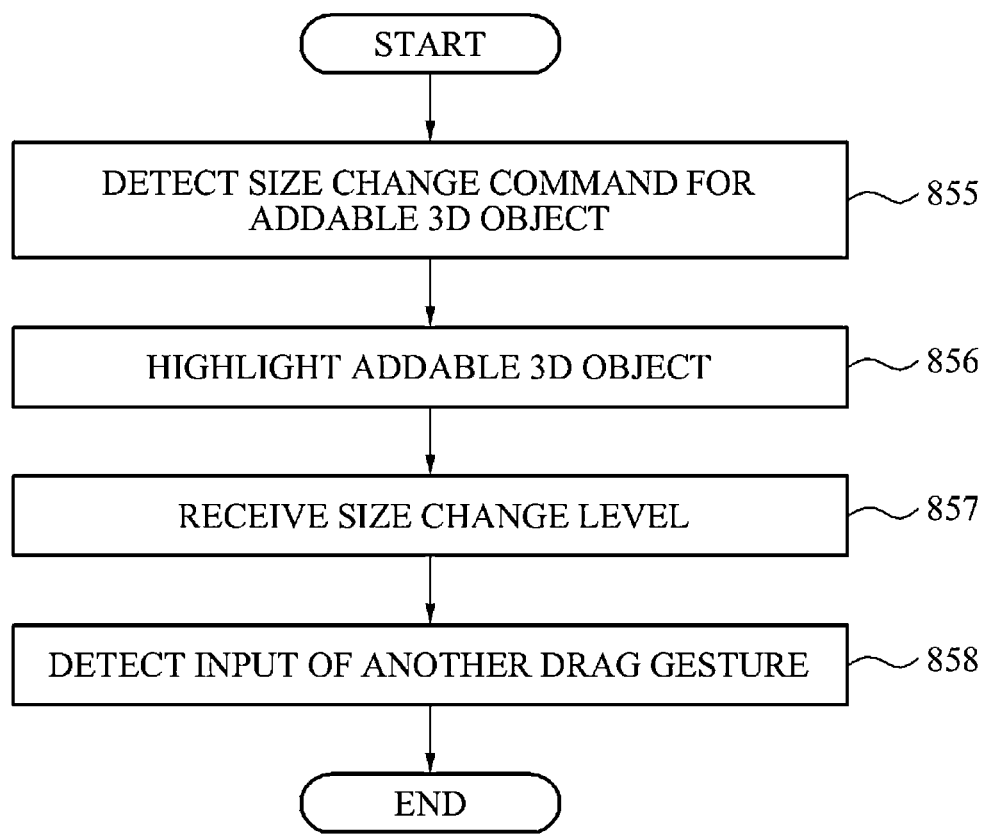
Figure 8F:
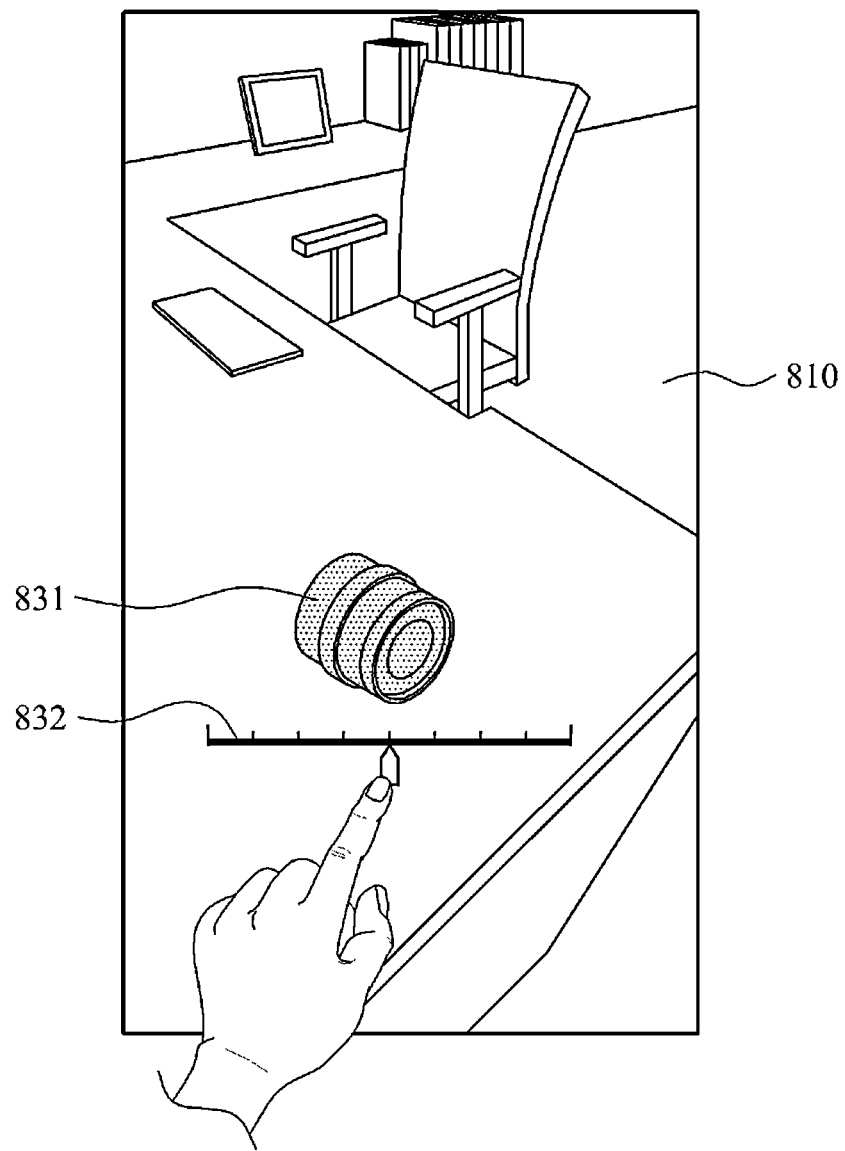

FIG. 8E is a flowchart illustrating a method of controlling an electronic device according to example embodiments, and FIG. 8F illustrates an example of a screen of an electronic device according to example embodiments.

Referring to FIG. 8E, in operation 855, the controller may detect a size change command, for example, a long-press gesture for an addable 3D object.

In operation 856, the controller may highlight the addable 3D object. Highlighting may indicate that the corresponding 3D object has entered a size change mode.

In operation 857, the input unit may receive a size change level. In an example in which the 3D object enters a size change mode, the controller may control a parameter 832 that enables the user to input a size change level to be displayed as illustrated in FIG. 8F. The controller may display the parameter 832 having a gradation capable of changing an object size. The user may input a size change level of the 3D object using the parameter 832. The controller may control a size of the 3D object to be changed based on the input size change level and be displayed. For example, referring to FIG. 8F, the user may input a drag gesture from a first point of the parameter 832 to a second point of the parameter 832, and the controller may control a size of an object 831 to be changed and displayed at the second point. Alternatively, the user may input a gesture of directly touching the second point, and the controller may control a size of the object 831 to be changed and be displayed at the second point.

In operation 858, the controller may detect an input of another drag gesture, and may control a position of the 3D object to be changed and displayed based on the detected input of the other drag gesture.

Figure 9:
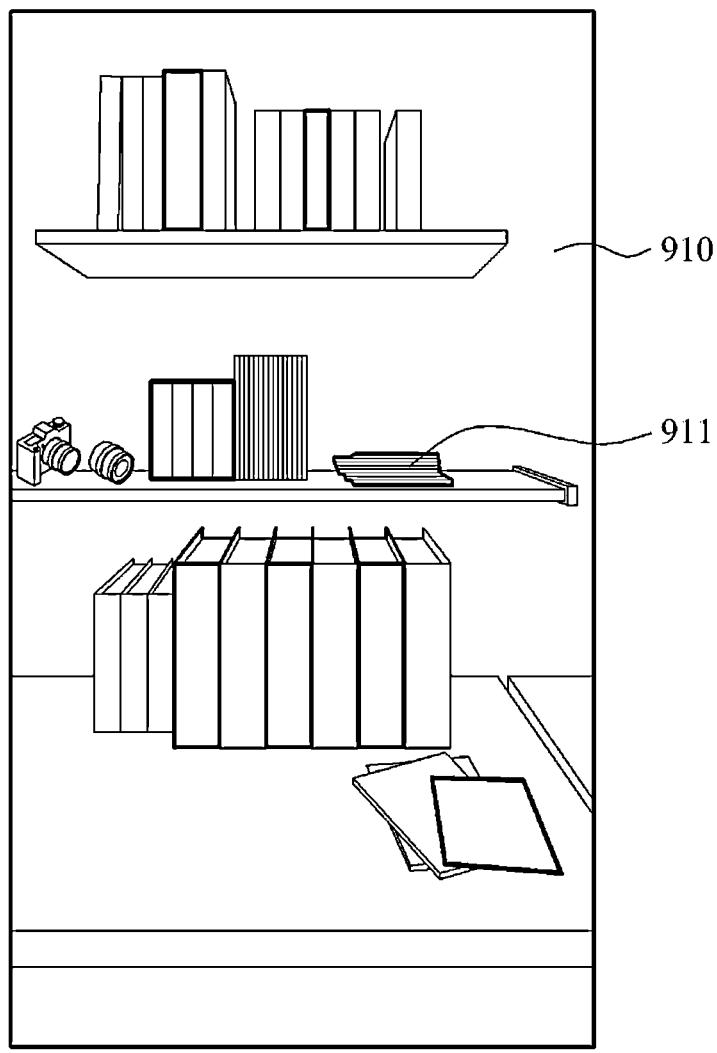
FIG. 9 illustrates an example of a screen of an electronic device according to example embodiments.

FIG. 9 illustrates an example of a screen of an electronic device according to example embodiments.

Referring to FIG. 9, the electronic device may display a 3D object corresponding to a 2D icon among the entire 3D objects, for example, a 3D object to which an attribute of the 2D icon is assigned, to be distinguished from other 3D objects. For example, a controller of the electronic device may control a 3D virtual space 910 to be displayed. A plurality of 3D objects may be present on the 3D virtual space 910. Referring to FIG. 9, the controller may display a 3D object 911 to which an attribute of a 2D icon is assigned, to be distinguished from other 3D objects. For example, the controller may display the 3D object 911 to which the attribute of the 2D icon is assigned, to be distinguished from other 3D objects by highlighting the 3D object 911.

Figure 10:
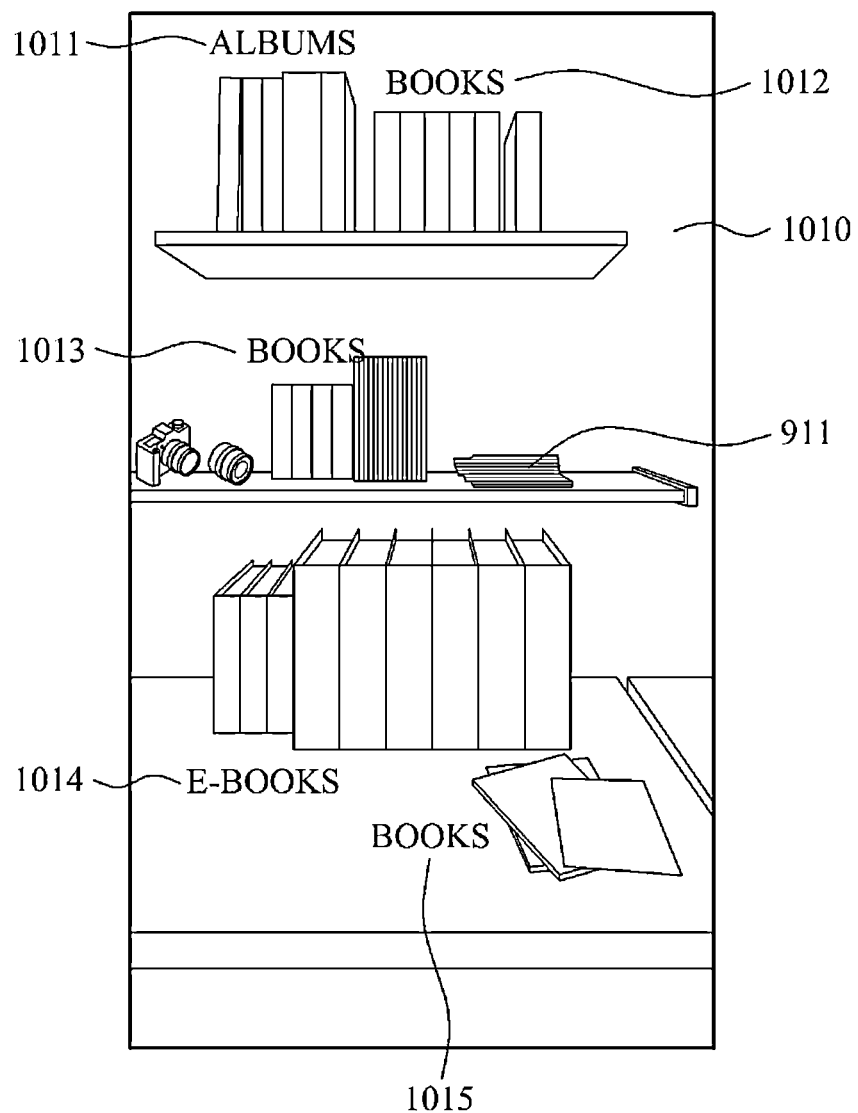
FIG. 10 illustrates another example of a screen of an electronic device according to example embodiments.

FIG. 10 illustrates another example of a screen of an electronic device according to example embodiments.

Referring to FIG. 10, the electronic device may further display identifiers 1011, 1012, 1013, 1014, and 1015 to 3D objects corresponding to 2D icons among 3D objects, for example, 3D objects to which attributes of the 2D icons are assigned, respectively. For example, the controller may control a 3D virtual space 1010 to be displayed. A plurality of 3D objects may be present on the 3D virtual space 1010.

The controller may control the identifiers 1011, 1012, 1013, 1014, and 1015 corresponding to the 3D objects to which the attributes of the 2D icons are assigned to be additionally displayed. For example, an identifier of each 3D object may be identical to an identifier of a corresponding 2D icon.

As described above, the user may quickly search for a desired object from among 3D objects present on a 3D virtual space.

Figure 11:
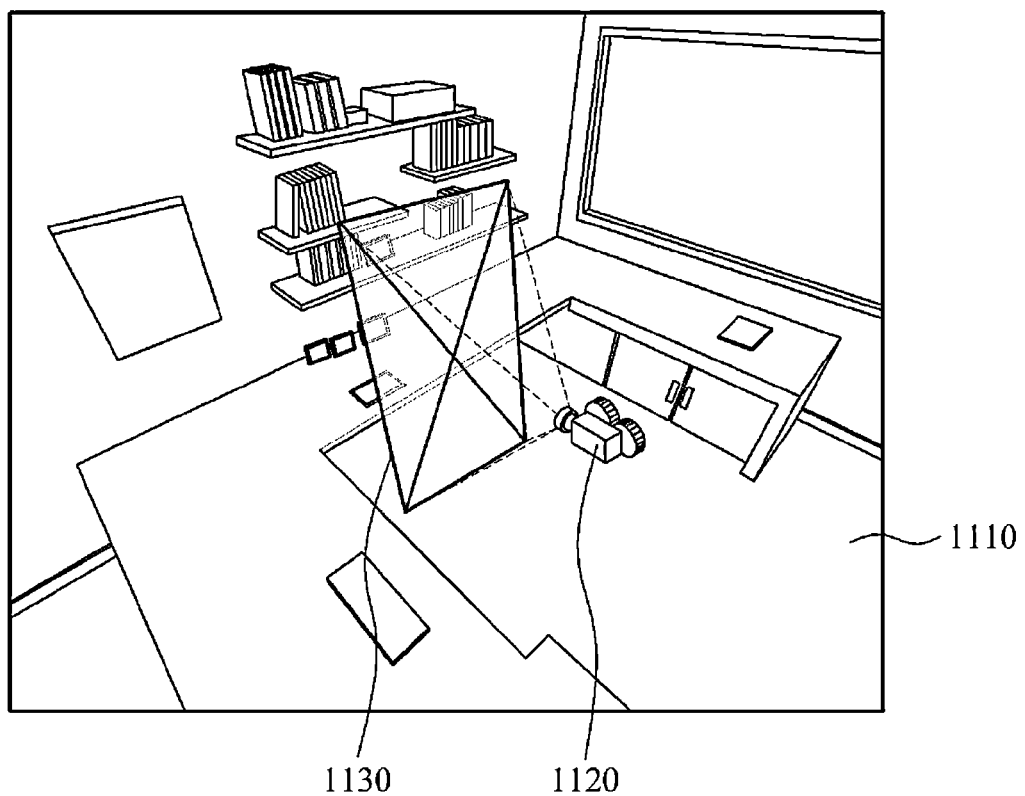
FIG. 11 illustrates an example of a screen of an electronic device to describe a user setting area according to example embodiments.

FIG. 11 illustrates an example of a screen of an electronic device to describe a user setting area according to example embodiments.

The electronic device may display a 3D virtual space 1110. A controller of the electronic device may provide a user interface for navigating the 3D virtual space 1110. For example, the controller may display a navigating device 1120 provided as a camera image, and may display a user setting candidate area 1130. The user setting candidate area 1130 may be set as an area that is being taken by the navigating device 1120.

A user may manipulate the electronic device to change the user setting candidate area 1130 using the navigating device 1120. For example, the user may control the electronic device to change the user setting candidate area 1130 by inputting a gesture of moving a taking direction of the navigating device 1120 provided as the camera image.

However, this is only an example and thus, it will be apparent to those skilled in the art that the controller may provide a navigating screen of the 3D virtual space 1110 in response to an input such as a rotation, tilting, and a linear acceleration of the electronic device.

The user setting candidate area 1130 may be a candidate area that is settable as a user setting area. The user setting area may refer to a 2D area of a 3D virtual space including a 3D object. For example, in FIG. 11, the user setting candidate area 1130 that is an area being taken by the navigating device 1120 may be a 2D area and the 2D area may include a 3D object. The user setting area may be provided for the user to quickly navigate the 3D virtual space 1110. When the user inputs a movement command based on a user setting area unit, the controller may move between set user setting areas in response to the movement command, which will be further described in the following.

Figure 12A:
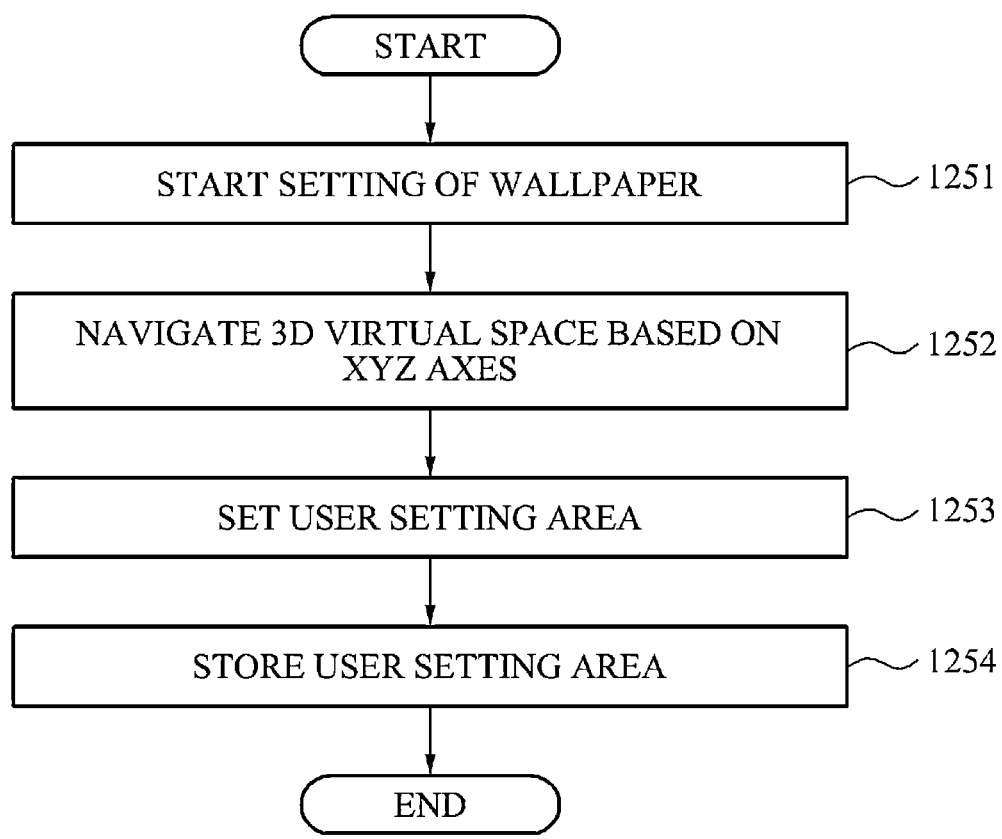
FIG. 12A is a flowchart illustrating a method of controlling an electronic device according to example embodiments.

FIG. 12A is a flowchart illustrating a method of controlling an electronic device according to example embodiments.

In operation 1251, the electronic device may start setting of a wallpaper. For example, a controller of the electronic device may set the wallpaper to be moved based on a user setting area unit.

Figure 12B:
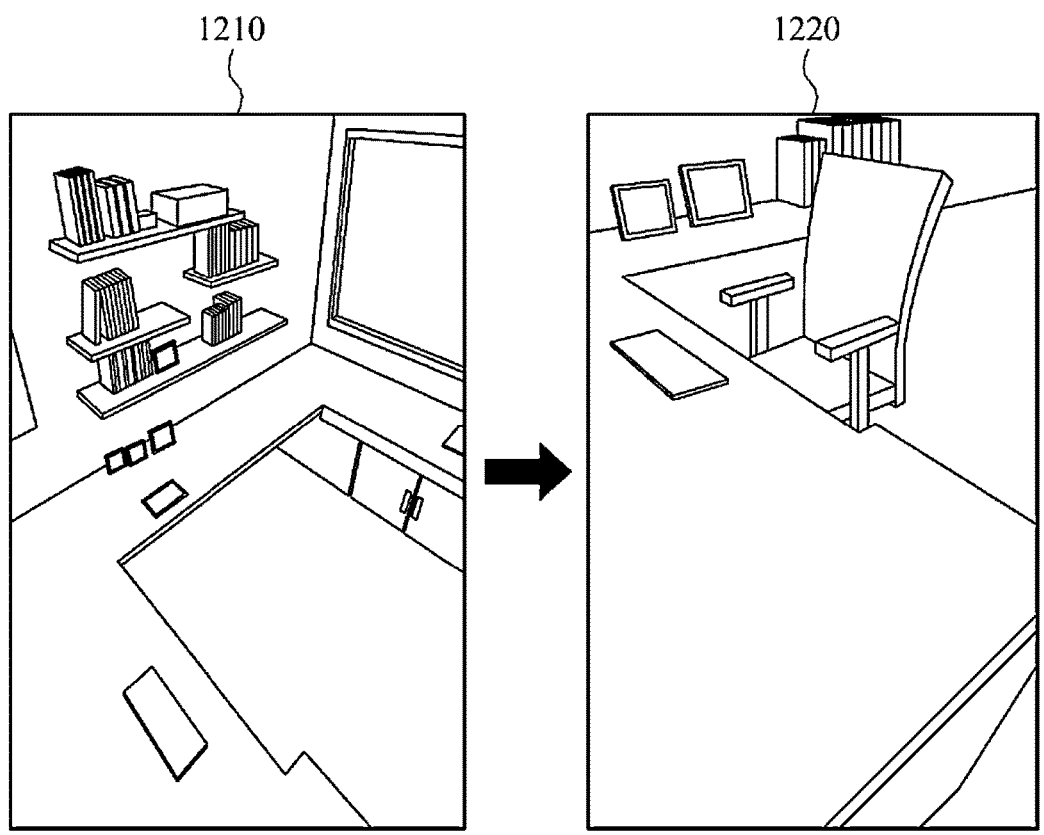
FIG. 12B illustrates examples of a screen of an electronic device according to example embodiments.

In operation 1252, the controller may navigate a 3D virtual space according to a user control. For example, FIG. 12B illustrates examples 1210 and 1220 of a screen of an electronic device according to example embodiments. Referring to FIG. 12B, the controller may change and provide a screen as if the user moves on the 3D virtual space. For example, the controller may change and provide a position and an observation viewpoint on the 3D virtual space according on the user control.

In operation 1253, the controller may set a user setting area in response to a setting command. The user may observe a user setting candidate area and may input, to the electronic device, a setting command to set a user setting area at a desired point. For example, the user may input a gesture, for example, a gesture of waving a hand in the air. Although not illustrated, a photographing unit or a proximity sensor of the electronic device may detect the gesture and may set a corresponding candidate area as the user setting area.

In operation 1254, the controller may control at least one user setting area to be stored in predetermined order.

In response to a movement command of a user setting area unit from the user, the controller may control each user setting area to be displayed while moving between user setting areas in the predetermined order.

Figure 13A:
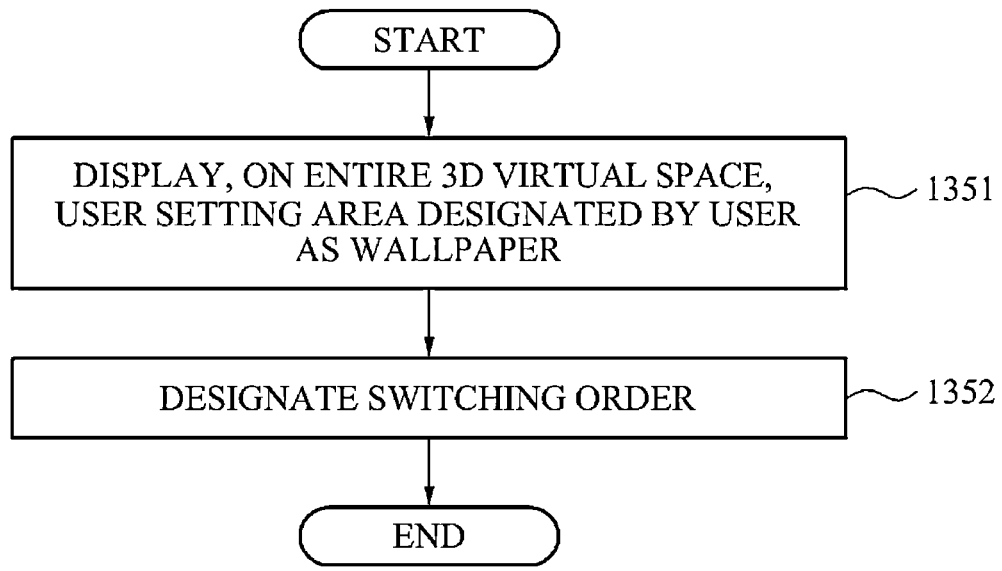
FIG. 13A is a flowchart illustrating a method of storing at least one user setting area in predetermined order.
Figure 13B:
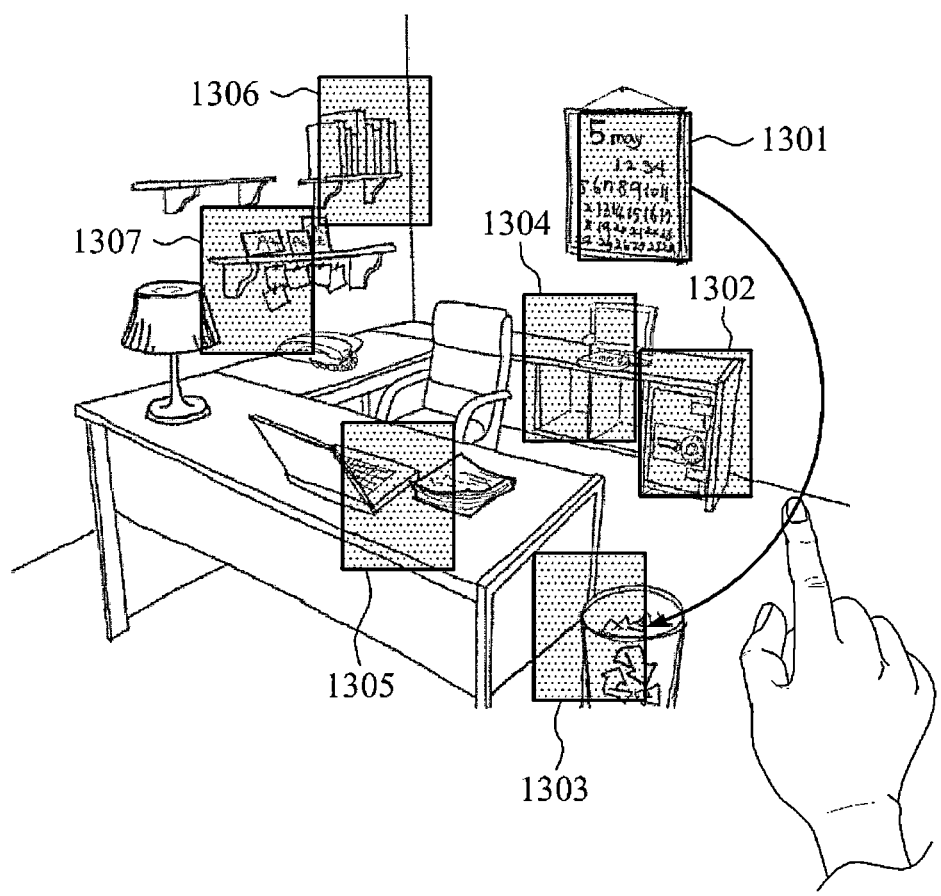
FIG. 13B illustrates an example of storing at least one user setting area in predetermined order according to example embodiments.

FIG. 13A is a flowchart illustrating a method of storing at least one user setting area in predetermined order, and FIG. 13B illustrates an example of storing at least one user setting area in predetermined order according to example embodiments.

In operation 1351, a controller of the electronic device may control a user setting area designated by a user as a wallpaper to be displayed on the entire 3D virtual space. For example, the controller may display user setting areas on the 3D virtual space. Referring to FIG. 13B, the user setting areas 1301, 1302, 1303, 1304, 1305, 1306, and 1307 may be displayed on the 3D virtual space.

In operation 1352, the user may designate a switching order of the user setting area. For example, referring to FIG. 13B, the user may input a gesture of dragging the user setting areas 1301, 1302, 1303, 1304, 1305, 1306, and 1307 in a descending order. The controller may assign a relatively high switching order to a user setting area that is preferentially designated by the user, and may assign a next high switching order to a next high user setting area.

In response to a movement command of a user setting area unit from the user, the controller may control each one user setting area to be displayed while moving between user setting areas in the switching order.

Figure 14:
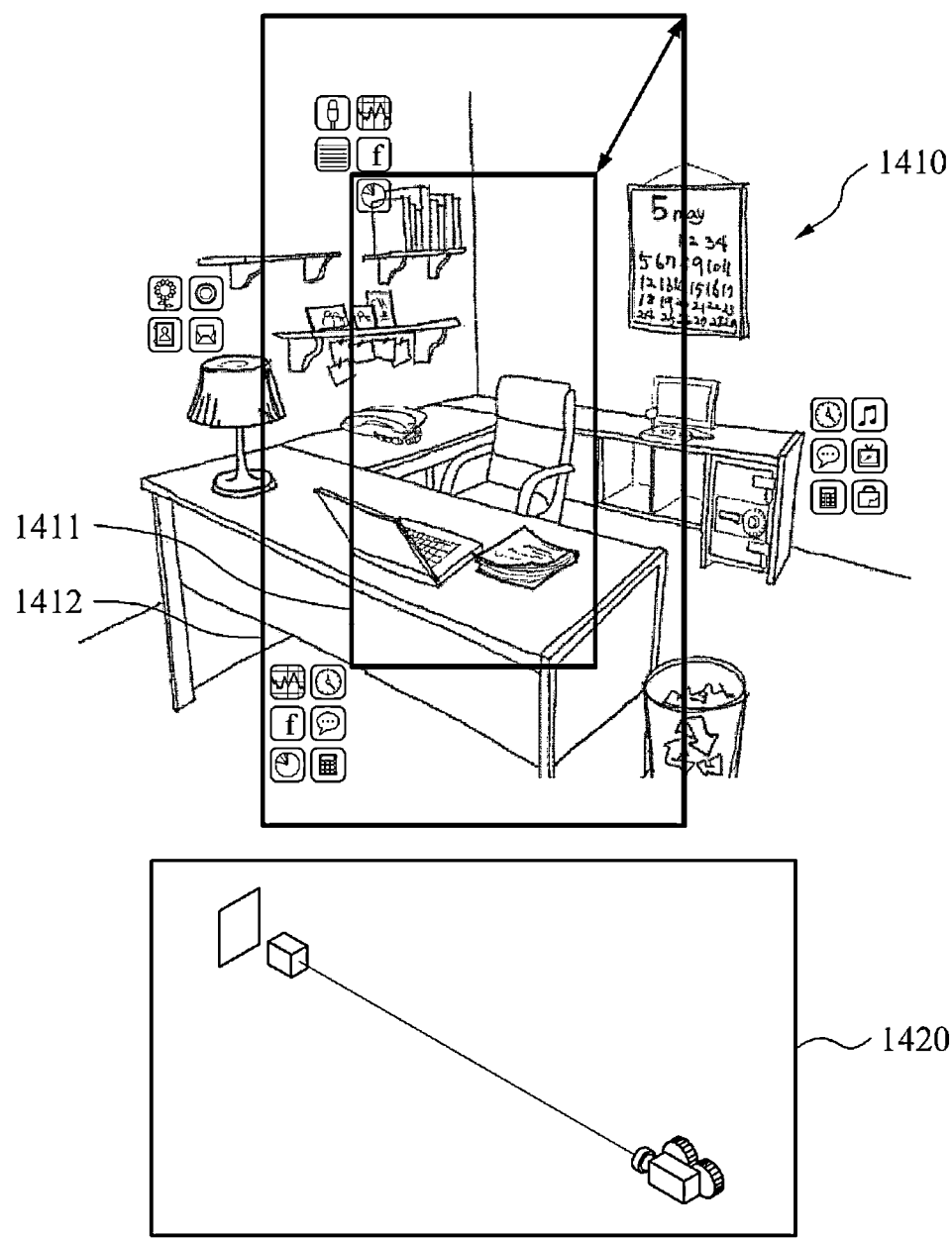
FIG. 14 illustrates an example of navigating a 3D virtual space according to example embodiments.

FIG. 14 illustrates an example of navigating a 3D virtual space 1410 according to example embodiments.

Referring to FIG. 14, a controller of the electronic device may detect a pinch-out gesture from a user. In response to the pinch-out gesture, the controller may perform displaying by switching a 3D virtual space 1412 displayed on a relatively wide area to a 3D virtual space 1411 displayed on a relatively narrow area. In an aspect that a 3D virtual display is displayed on the display unit 190 with the same size, the controller may provide an enlarged screen in response to the pinch-out gesture.

In response to a pinch-in gesture input from the user, the controller may perform displaying by switching the 3D virtual space 1411 displayed on the relatively narrow area to the 3D virtual space 1412 displayed on the relatively wide area.

The user may manipulate the electronic device to call a navigating device 1420 in a camera image, instead of using a pinch-in gesture or a pinch-out gesture. The controller may provide the navigating device 1420 in response to the call command. The user may further closely observe a 3D virtual space using the navigating device 1420.

According to example embodiments, the controller 130 may navigate a 3D virtual space using multiple touches. For example, the user may input a gesture of fixing a single touch and dragging another touch, and in response thereto, the controller may control the 3D virtual space to be panned and displayed.

Figure 15A:
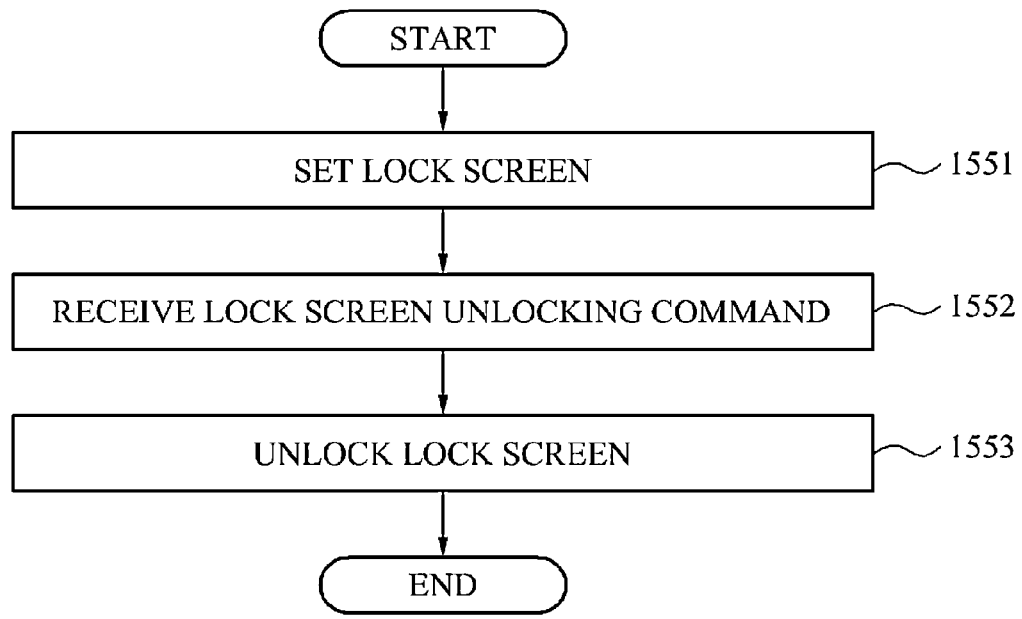
FIG. 15A is a flowchart illustrating a method of configuring a lock screen according to example embodiments.
Figure 15B:
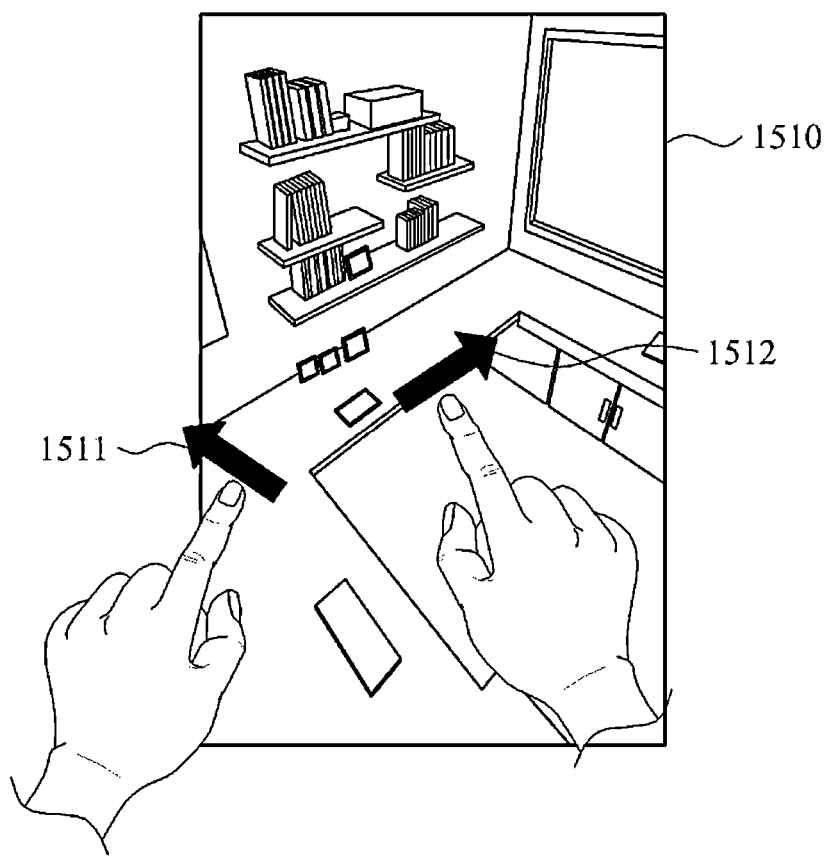
FIG. 15B illustrates an example of unlocking a lock screen according to example embodiments.

FIG. 15A is a flowchart illustrating a method of configuring a lock screen according to example embodiments, and FIG. 15B illustrates an example of unlocking a lock screen according to example embodiments.

In operation 1551, the controller may set a lock screen on a 3D virtual space 1510. In this example, although a 3D object present on the 3D virtual space is designated, a corresponding function, for example, a corresponding application may not be executed or an application related function may not be output.

In operation 1552, the electronic device may receive a lock screen unlocking command. For example, referring to FIG. 15B, a user may input navigating commands 1511 and 1512 into predetermined areas.

In operation 1553, the electronic device may unlock the lock screen when the lock screen unlocking command is identical to a predetermined unlock command. When the lock screen is unlocked, the electronic device may display a predetermined screen. For example, the electronic device may display a 3D virtual space screen corresponding to a single area of FIG. 13B. Alternatively, the electronic device may also display a 3D virtual space screen corresponding to an unlock command. In detail, the electronic device may determine a position at which the lock screen unlocking command is input. The electronic device may also display a corresponding 3D virtual space screen on a single area of FIG. 13B corresponding to the position.

FIG. 16A is a flowchart illustrating a method for secure storage according to example embodiments.

In operation 1651, the electronic device may display a secure 3D storage object on a 3D virtual space. The secure 3D storage object may refer to a folder functioning 3D object capable of including at least one 2D icon. The secure 3D storage object may securely store a 2D icon.

Figure 16B:
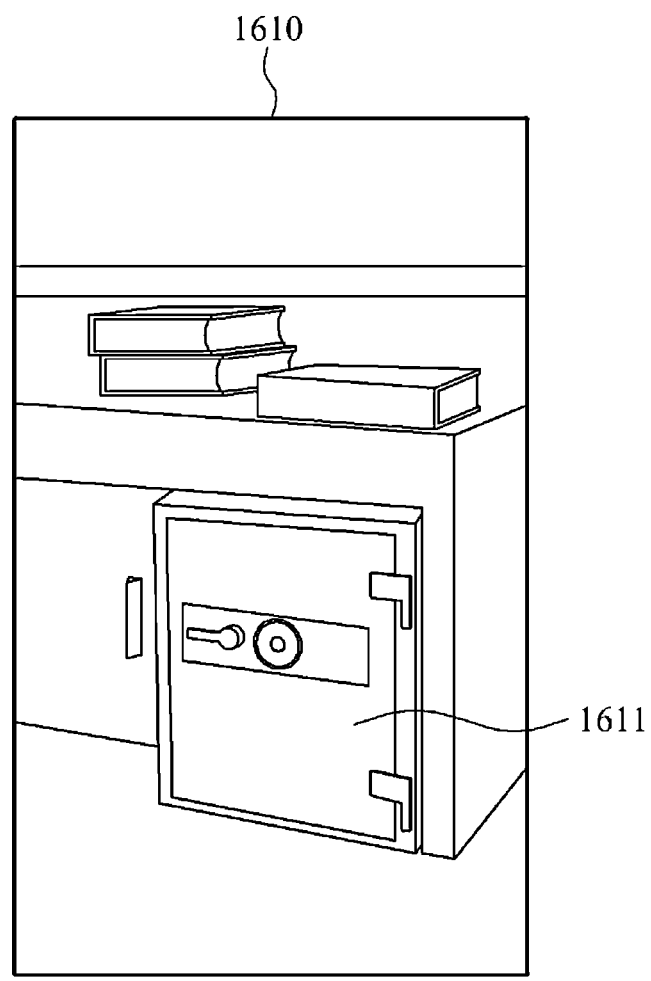
FIG. 16B illustrates an example of a secure 3D storage object according to example embodiments.

For example, FIG. 16B illustrates an example of a secure 3D storage object according to example embodiments. The electronic device may display a secure 3D storage object 1611, such as a safe, for example, on a 3D virtual space 1610. A user may securely store at least one 2D icon or 3D object in the secure 3D storage object 1611. For example, a controller of the electronic device may receive a setting of a password when storing a 2D icon or a 3D object.

In operation 1652, the electronic device may receive a designation on the secure 3D storage object.

Figure 16C:
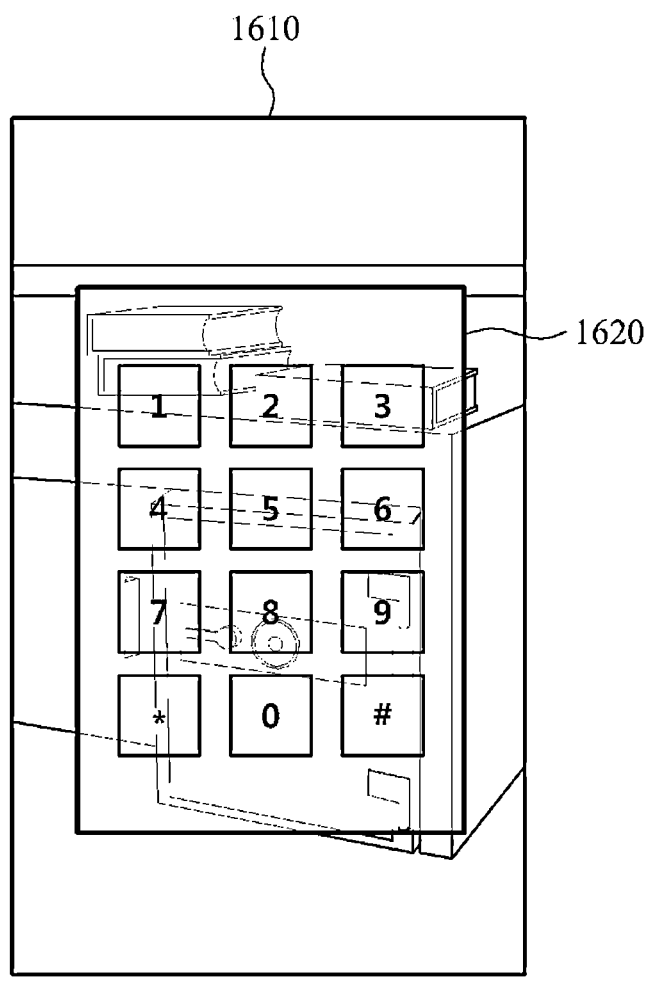
FIG. 16C illustrates an example of a security cancel user interface capable of inputting a password according to example embodiments.

When the secure 3D storage object is designated, the controller may display a security cancel user interface. For example, referring to FIG. 16C, the controller may provide a security cancel user interface 1620 capable of inputting a password.

In operation 1653, the electronic device may receive a security cancel command, for example, a password and in response thereto, the controller may determine whether the security cancel command is suitable. For example, the controller may determine whether the input password matches a predetermined password.

In operation 1654, when the security cancel command is determined to be suitable, the controller may control the 2D icon or the 3D object stored in the secure 3D storage object to be displayed.

Figure 17A:
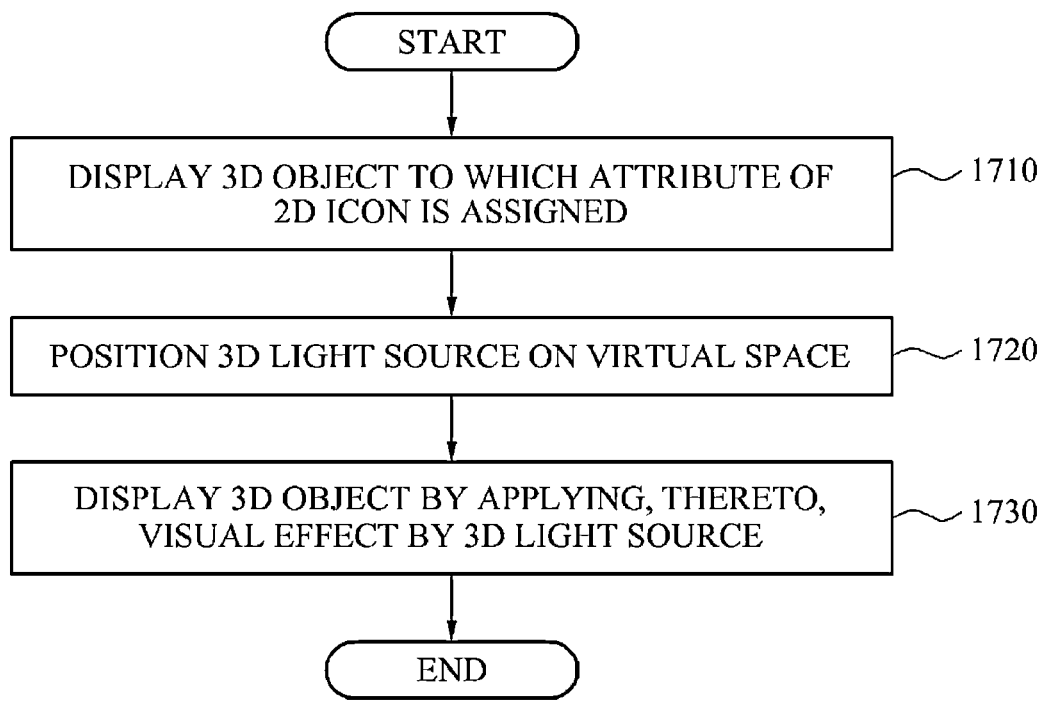
FIGS. 17A, 17B, and 17C are flowcharts illustrating a method of controlling an electronic device according to example embodiments.
Figure 17B:
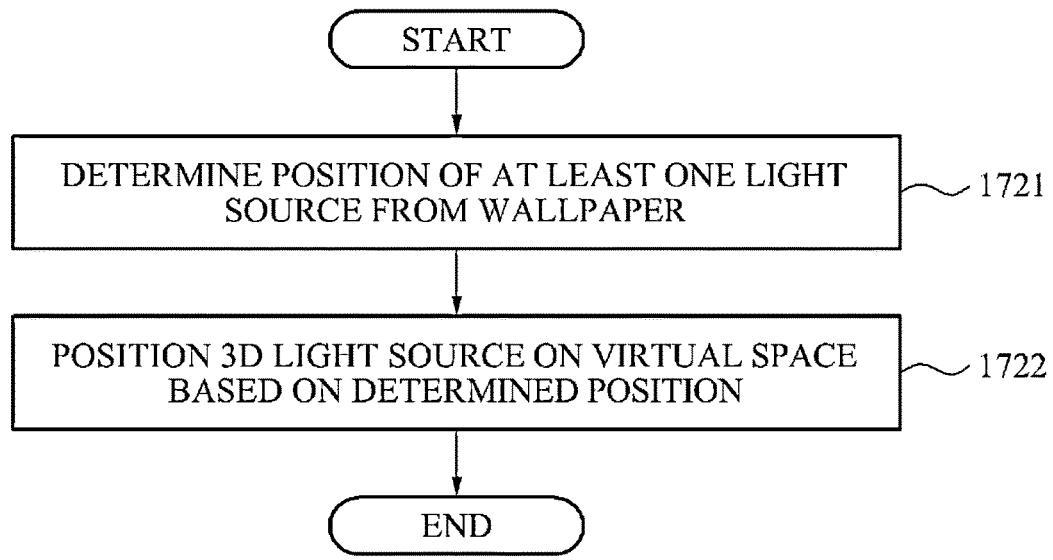
Figure 17C:
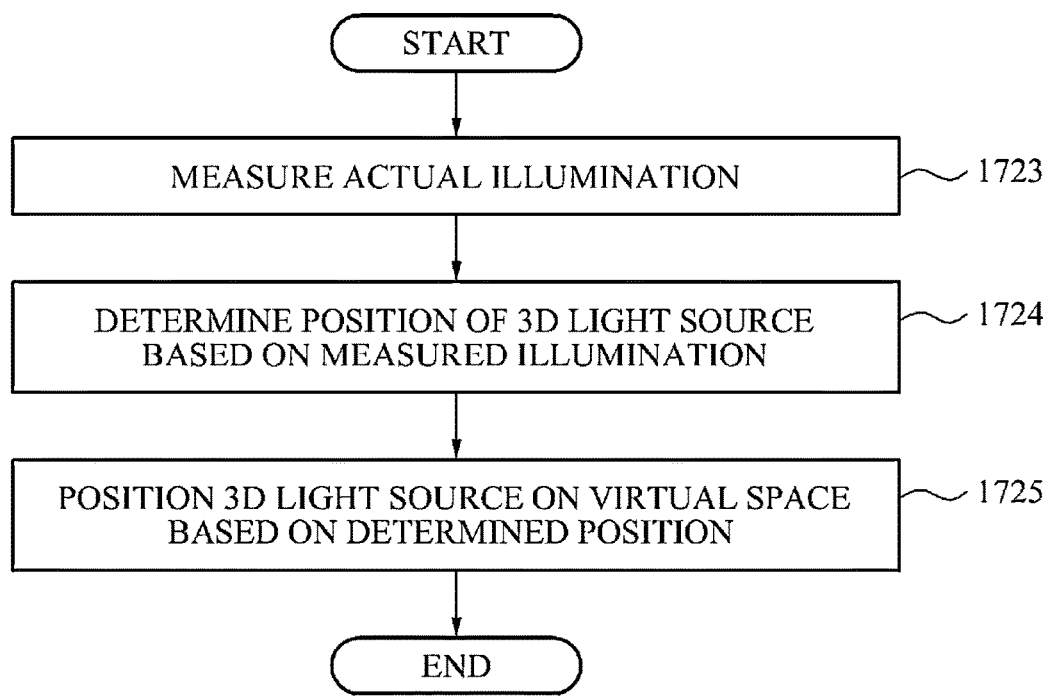

FIGS. 17A through 17C are flowcharts illustrating a method of controlling an electronic device according to example embodiments.

Figure 18A:
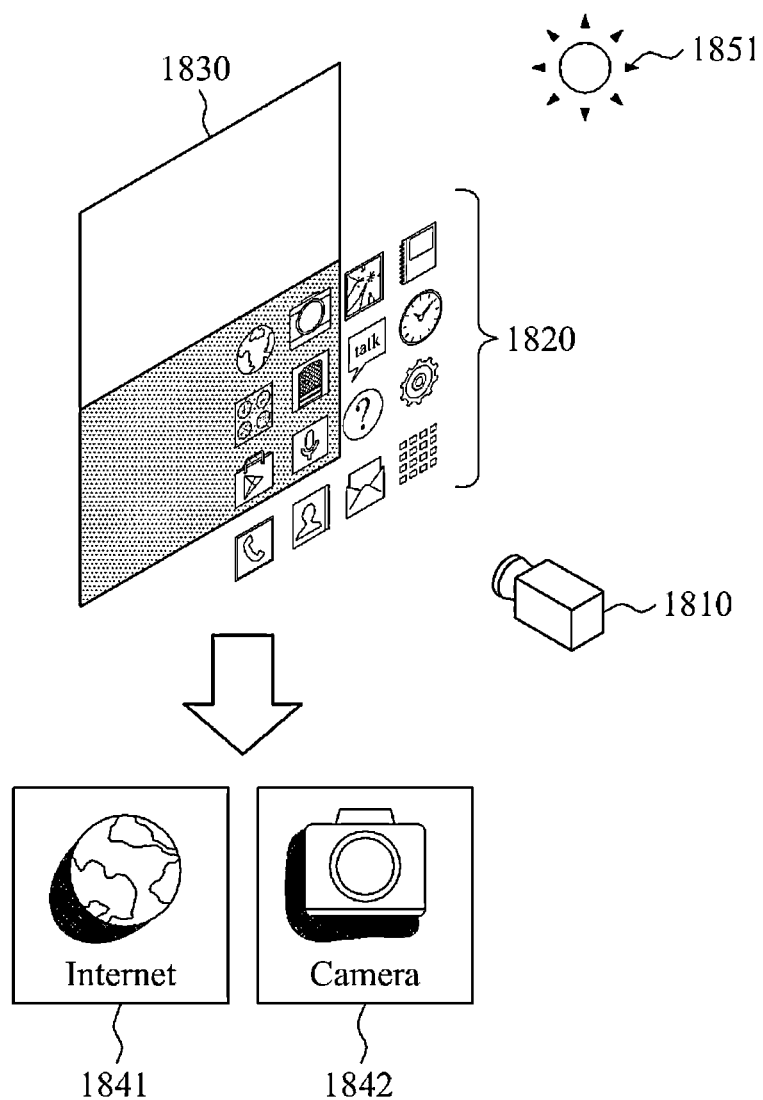
FIGS. 18A and 18B illustrate examples of displaying a 3D object according to example embodiments.
Figure 18B:
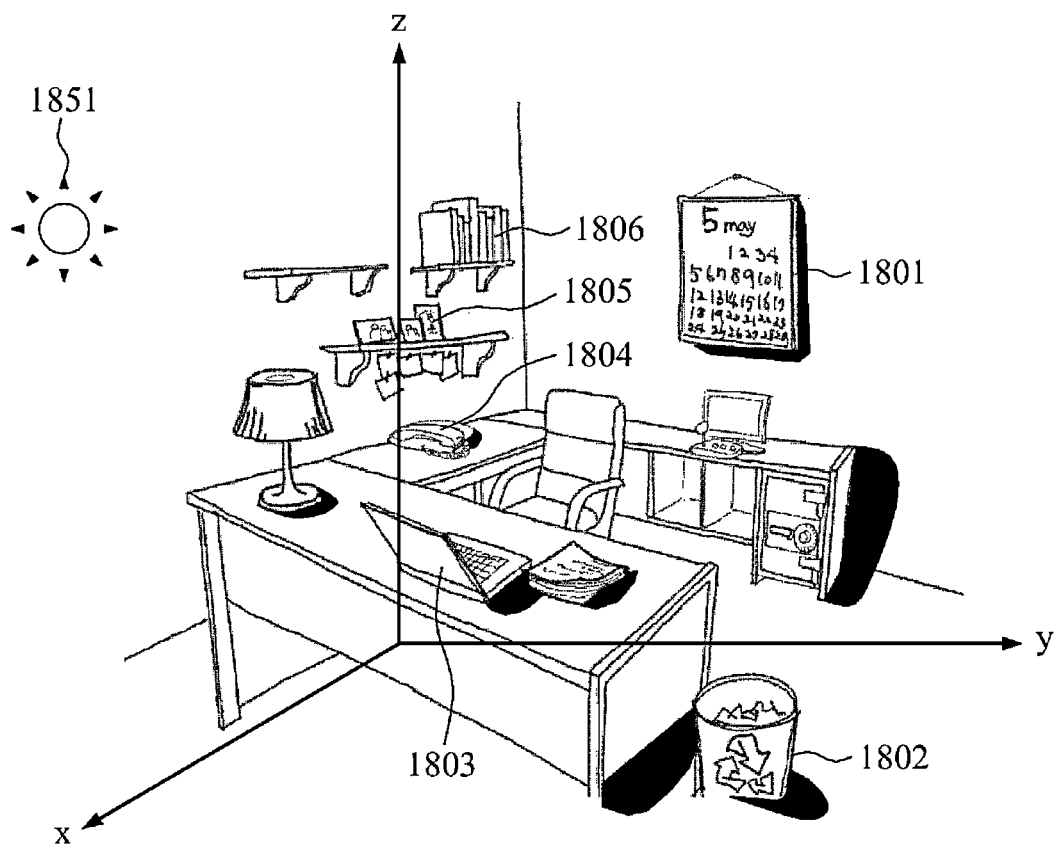

The controlling method of FIG. 17A is described with reference to FIGS. 18A and 18B. FIGS. 18A and 18B illustrate examples of displaying a 3D object according to example embodiments.

In operation 1710, the electronic device may arrange and display, on a 3D virtual space, a 3D object to which an attribute of a 2D icon is assigned. For example, referring to FIG. 18A, the electronic device may display 3D objects 1820 on the 3D virtual space. The electronic device may assign attributes of corresponding 2D icons to the 3D objects 1820, respectively, and may display the 3D objects 1820 to which the attributes are assigned, to be separated from a wallpaper 1830 by a predetermined height. The electronic device may display a navigating device 1810 in a camera image.

In operation 1720, the electronic device may position at least one 3D light source on a virtual space. Referring to FIG. 18A, the electronic device may position a 3D light source 1851 at predetermined coordinates of a virtual space. The electronic device may set light source information including at least one of quantity of light, a light emission direction, and a position of the 3D light source 1851. The electronic device may position a light source corresponding to set light source information on the virtual space, and may determine light source information from the wallpaper 1830. Alternatively, the electronic device may set light source information based on illumination information measured at an actual light sensor, and may also set light source information corresponding to a current time set in the electronic device.

In operation 1730, the electronic device may display the 3D object by applying, to the 3D object, a visual effect by the 3D light source. For example, the electronic device may display the 3D object by applying, to the 3D object, the visual effect, such as a specula effect, a normal effect, a spreading effect, a bump effect, a reflection effect, and a refraction effect, for example, based on light emitted from the 3D light source 1851. Referring to FIG. 18A, the electronic device may display, on the 3D virtual space, 3D objects 1841 and 1842 to which the visual effect is applied. The 3D visual objects 1841 and 1842 to which the visual effect is applied may have shadows and may also additionally include a reflection effect.

Although an embodiment in which a single 3D light source is provided is described with reference to FIG. 18A, the electronic device may position a plurality of 3D light sources and then apply a 3D visual effect by the plurality of 3D light sources to a plurality of 3D objects.

Also, although 3D objects are displayed in a shape of 2D icons in FIG. 18A, this is only an example. The electronic device may display 3D objects 1801, 1802, 1803, 1804, 1805, and 1806 as illustrated in FIG. 18B. The electronic device may apply a visual effect by the 3D light source 1851 to each of the 3D objects 1801, 1802, 1803, 1804, 1805, and 1806.

Figure 19:
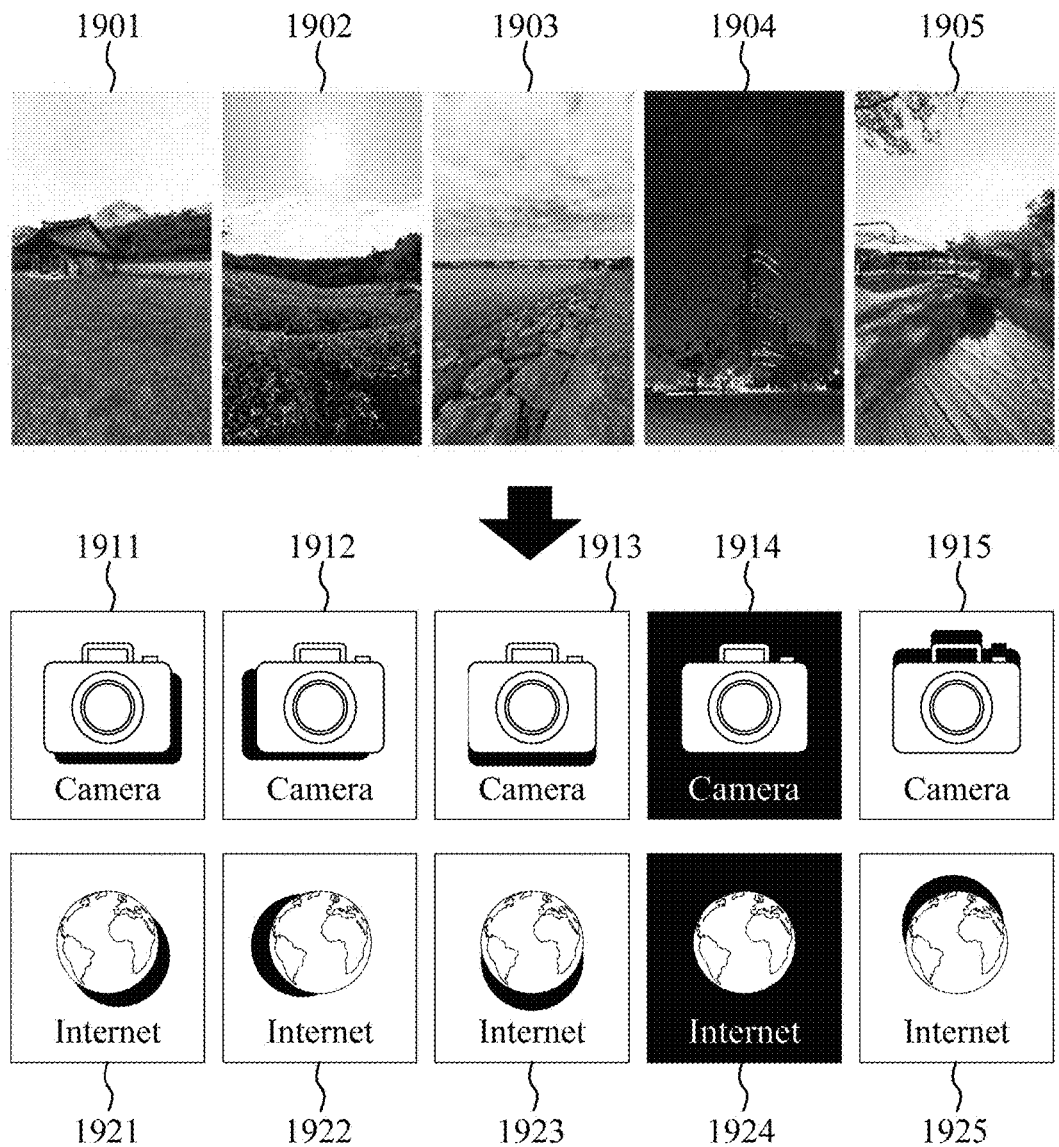
FIG. 19 illustrates an example of determining a position of a 3D light source according to example embodiments.
Figure 20A:
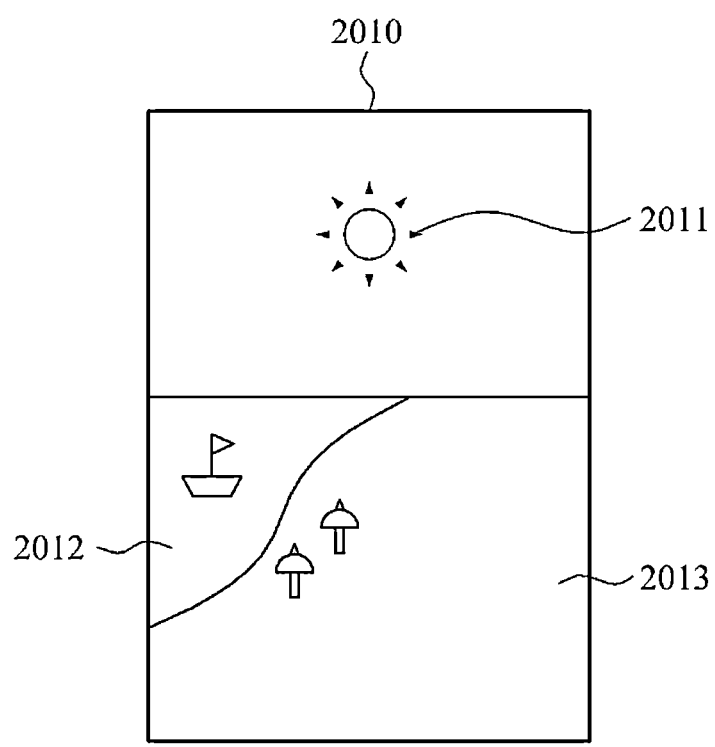
FIGS. 20A, 20B, and 20C illustrate examples of determining a position of a 3D light source according to example embodiments.
Figure 20B:
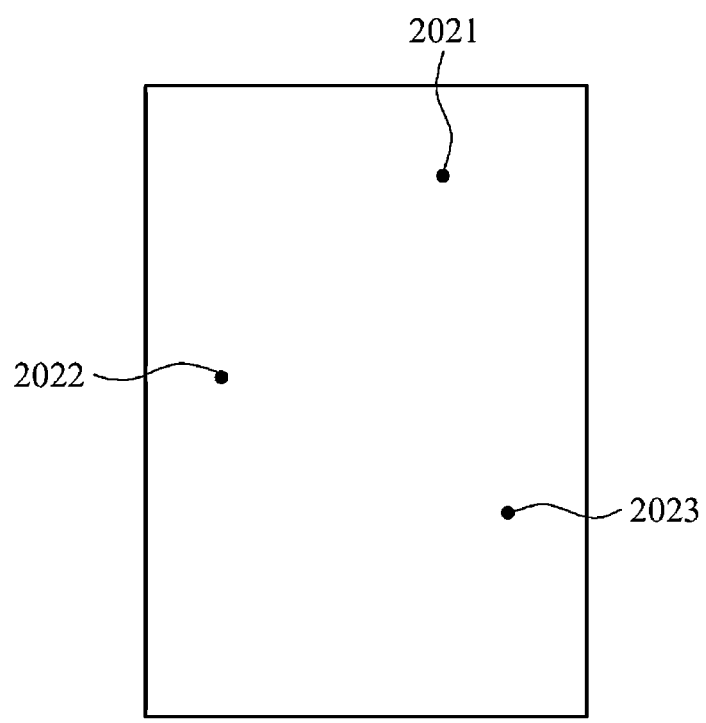
Figure 20C:
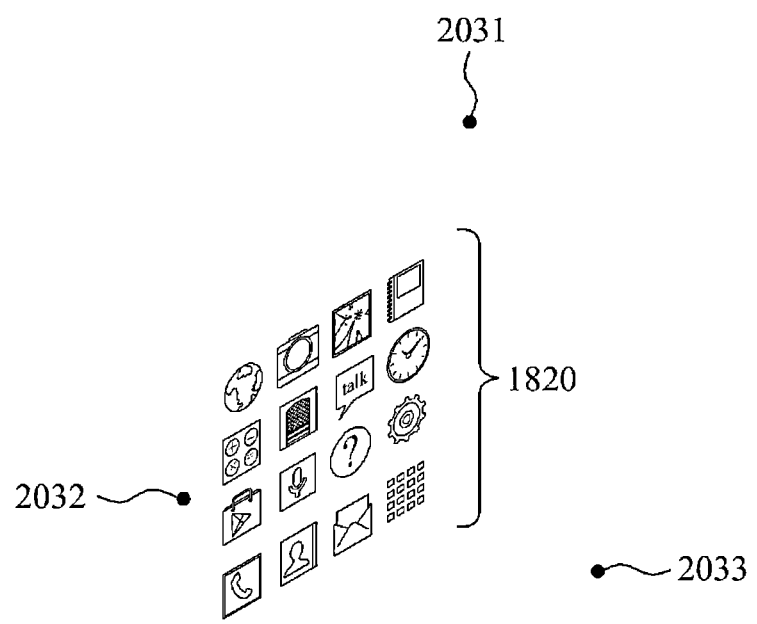

FIG. 17B is a flowchart illustrating a method of controlling an electronic device according to example embodiments, and FIG. 19 illustrates an example of determining a position of a 3D light source according to example embodiments. Hereinafter, the controlling method of FIG. 17B will be described with reference to FIG. 19. In addition, FIGS. 20A through 20C illustrate examples of determining a position of a 3D light source according to example embodiments. The controlling method of FIG. 17B will be described with reference to FIGS. 20A through 20C.

In operation 1721, the electronic device may determine a position of at least one 3D light source from a wallpaper being displayed. The electronic device may determine a variety of wallpapers 1901, 1902, 1903, 1904, and 1905. The electronic device may determine a position of at least one 3D light source from a wallpaper being displayed. In an example in which the electronic device displays a wallpaper 2010 of FIG. 20A, the wallpaper 2010 may include a sun object 2011, a sea object 2012, a sand object 2013, and other objects.

The electronic device may determine a position of at least one 3D light source based on a pixel value of the wallpaper 2010. For example, the electronic device may verify a brightness value of each of pixels of the wallpaper 2010 and may determine a position of a 3D light source based on the verified brightness value. In detail, the electronic device may determine that the 3D object light source is positioned in at least one pixel having a local maximum value of pixel brightness values. Alternatively, the electronic device may determine that the 3D light source is positioned in at least one pixel having a brightness value greater than a predetermined threshold.

The electronic device may determine a position of a 3D light source from a wallpaper using a variety of methods. For example, referring to FIG. 20B, the electronic device may determine positions of three 3D light sources 2021, 2022, and 2023. Although each of the 3D light sources 2021, 2022, and 2023 is illustrated as a single pixel, this is only an example and thus, each of the 3D light sources 2021, 2022, and 2023 may have a size corresponding to a plurality of pixels.

Referring again to FIG. 17B, in operation 1722, the electronic device may position the 3D light source on a virtual space based on the determined position. For example, referring to FIG. 20C, the electronic device may position 3D light sources 2031, 2032, and 2033.

The electronic device may display each 3D object by applying, to each 3D object, a visual effect corresponding to a 3D light source. As described above, the electronic device may determine positions of various 3D light sources with respect to various wallpapers. In addition, the electronic device may display the 3D objects by applying, to the 3D objects, various visual effects corresponding to the determined 3D light sources, respectively. Accordingly, as illustrated in FIG. 19, the electronic device may display each 3D object by applying different visual effects 1911, 1912, 1913, 1914, and 1915, or 1921, 1922, 1923, 1924, and 1925 with respect to the wallpapers 1901, 1902, 1903, 1904, and 1905, respectively. In detail, from the wallpaper 1901, the electronic device may determine that a position of a 3D light source is positioned on the relatively left. From the wallpaper 1902, the electronic device may determine that a position of a 3D object is positioned on the relatively right. Accordingly, the electronic device may position the 3D light source on the wallpaper 1901 from the right to the left and accordingly, apply the visual effect 1911 or 1921 to a 3D object. The electronic device may position the 3D light source on the wallpaper 1902 from the left to the right and accordingly, apply the visual effect 1912 or 1922 to a 3D object. In this manner, different visual effects may be applied to the same 3D object. For example, due to the 3D light source positioned on the relatively left, the 3D object may be shadowed in the right direction of a corresponding object. Due to the 3D light source positioned on the relatively right, the 3D object may be shadowed in the left direction of a corresponding object.

FIG. 17C is a flowchart illustrating a method of controlling an electronic device according to example embodiments.

In operation 1723, the electronic device may measure an actual illumination. The electronic device may include an illumination sensor, such as a photodiode, for example, or may receive illumination information from an outside of the electronic device. In operation 1724, the electronic device may determine a position of a 3D light source based on the measured illumination information. In operation 1725, the electronic device may position the 3D light source on the virtual space based on the determined position.

Alternatively, the electronic device may determine the position of the 3D light source based on current time information, which will be further described with reference to FIG. 21.

Figure 21:
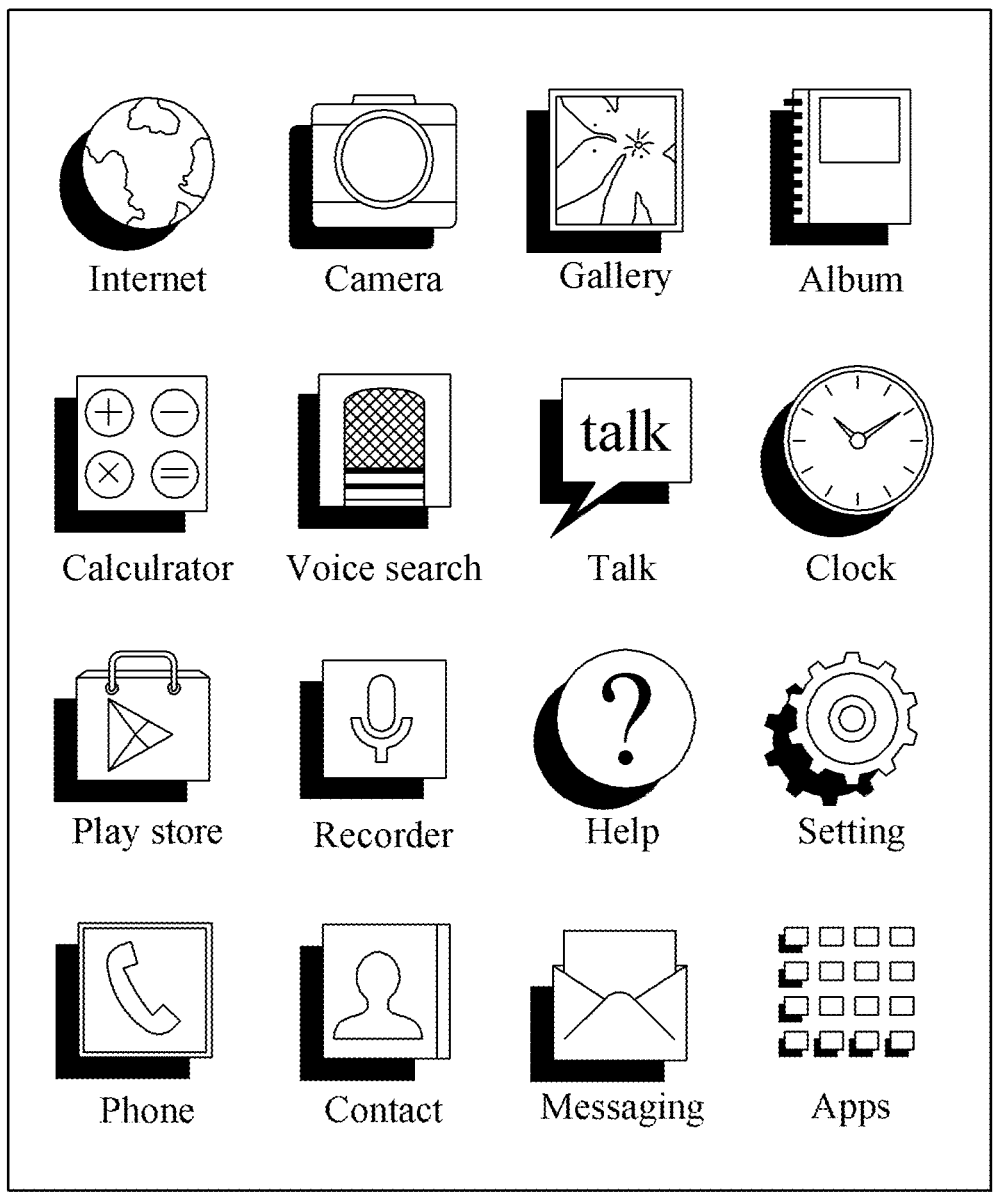
FIG. 21 illustrates an example of a 3D object to which a visual effect is applied in correspondence to a 3D light source according to example embodiments.

FIG. 21 illustrates an example of a 3D object to which a visual effect is applied in correspondence to a 3D light source according to example embodiments. Referring to FIG. 21, the electronic device may display each 3D object by apply a visual effect thereto. The electronic device may determine a position of a 3D light source from a wallpaper and may display each 3D object by applying a visual effect thereto based on the determined position of the 3D light source.

Figure 22:
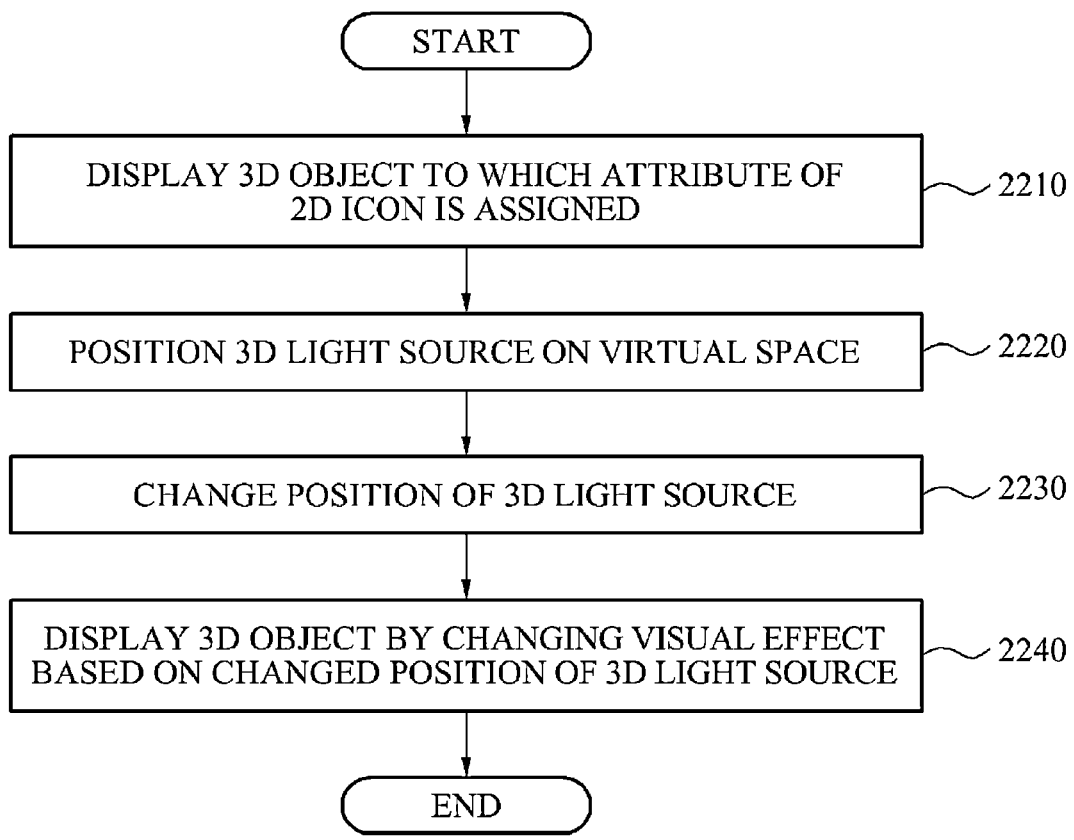
FIG. 22 is a flowchart illustrating a method of controlling an electronic device according to example embodiments.
Figure 23:
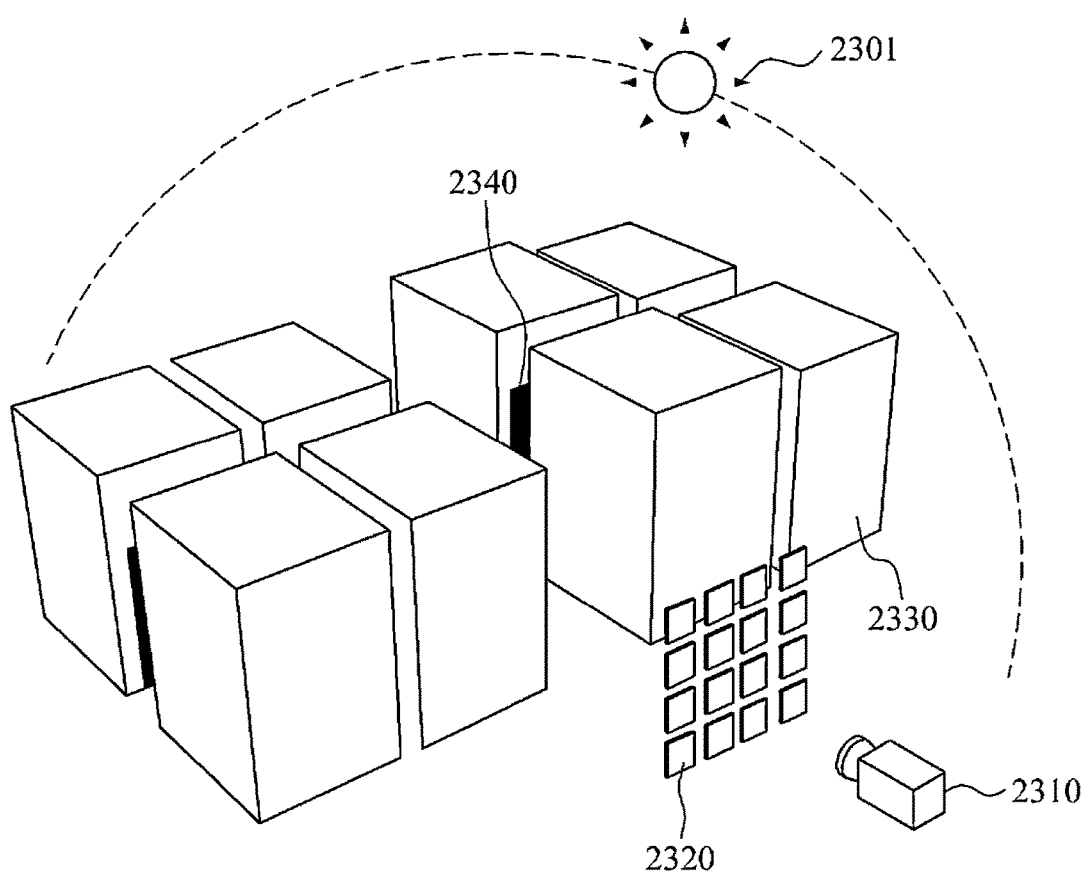
FIG. 23 illustrates an example of changing a position of a 3D light source according to example embodiments.

FIG. 22 is a flowchart illustrating a method of controlling an electronic device according to example embodiments. The controlling method of FIG. 22 will be further described with reference to FIG. 23. FIG. 23 illustrates an example of changing a position of a 3D light source according to example embodiments.

In operation 2210, the electronic device may display a 3D object to which an attribute of a 2D icon is assigned. For example, referring to FIG. 23, the electronic device may display a navigating device 2310 in a camera image, a 3D object 2320, and a 3D background 2340. The 3D object 2320 and the 3D background 2340 may be displayed on a 3D virtual space 2330.

In operation 2220, the electronic device may position a 3D light source at a first point of the 3D virtual space. The electronic device may display the 3D object by applying, to the 3D object, a visual effect by the 3D light source positioned at the first point. Referring to FIG. 23, light emitted from the 3D light source 2301 may be reflected from the 3D background 2340 and may affect the visual effect of the 3D object 2320. In addition, light reflected from the 3D object 2320 may also affect the visual effect of the 3D background 2340. For example, the 3D object 2320 and the 3D background 2340 may serve as 3D light sources with respect to each other.

In operation 2230, the electronic device may change a position of the 3D light source. In operation 2240, the electronic device may display the 3D object by changing the visual effect based on the changed position of the 3D light source. The electronic device may change the position of the 3D light source from the first point to a second point. For example, referring to FIG. 23, the electronic device may change a position of a 3D light source 2301 and may also change the position of the 3D light source 2301 based on a current time. The electronic device may store a current time and mapping data of altitude of the sun corresponding to the current time, and may change the altitude of the 3D light source 2301 based on the verified current time. The electronic device may change a position of the 3D light source 2301 over time.

Alternatively, the electronic device may determine whether to change a position of a 3D light source in response to a change of a wallpaper. The electronic device may change a visual effect of a 3D object based on the changed position of the 3D light source and may apply the changed visual effect. Alternatively, the electronic device may also detect a change in actual illumination and accordingly, determine a change in a position of the 3D light source. The electronic device may change a visual effect of the 3D object based on the changed position of the 3D light source and may apply the changed visual effect.

Figure 24A:
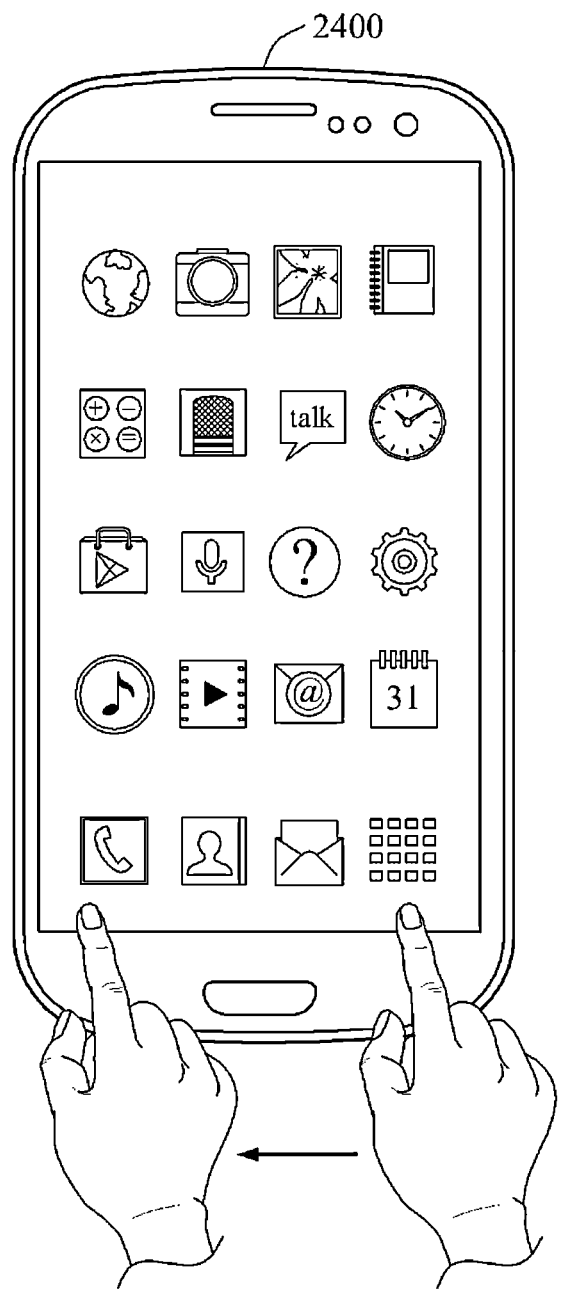
FIGS. 24A, 24B, and 24C illustrate examples describing an operation of an electronic device according to example embodiments.
Figure 24B:
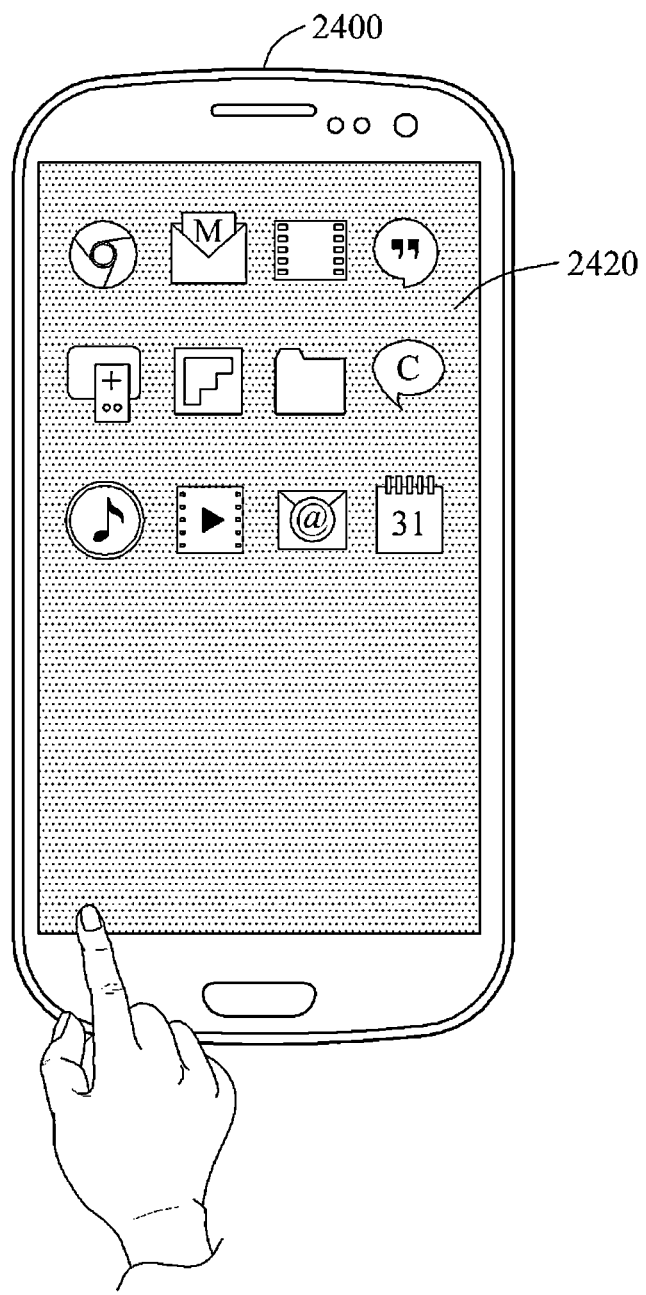
Figure 24C:
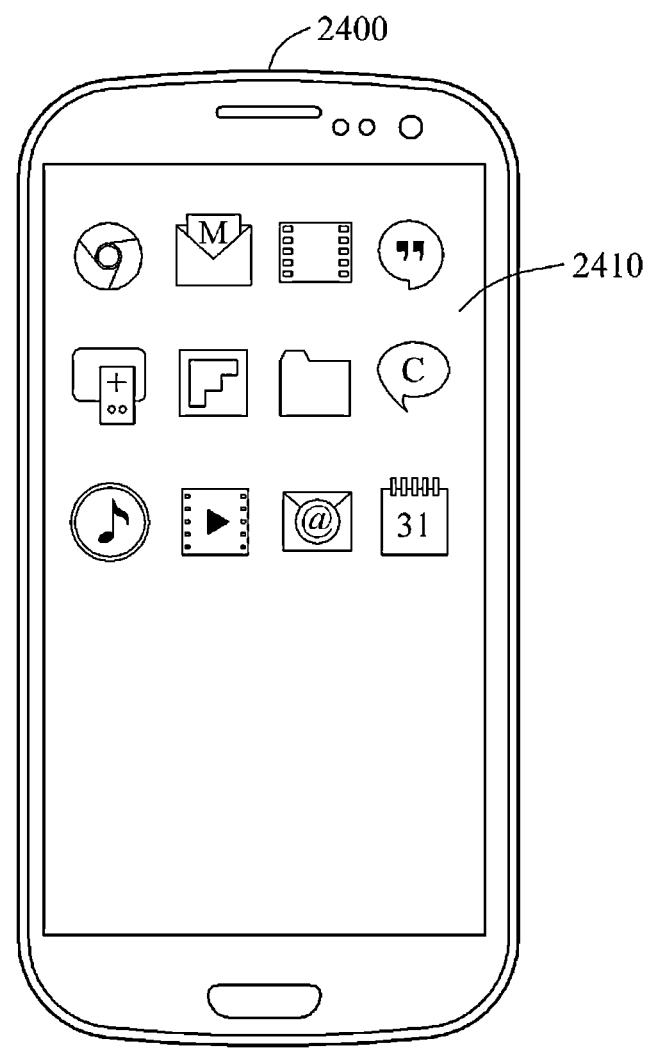

FIGS. 24A through 24C illustrate examples describing an operation of an electronic device 2400 according to example embodiments.

Referring to FIG. 24A, the electronic device 2400 may display a menu screen including at least one icon. The menu screen may include a wallpaper 2410 in addition to the at least one icon. The wallpaper 2410 may be configured as a default or may be configured using a variety of images based on settings of a user. In this example, the user may not readily identify an icon due to the wallpaper 2410. When the user desires to search for a predetermined icon, the above issue may be magnified. Referring to 24A, the user may control the electronic device 2400 to switch a menu screen by entering a screen switch command, such as a scroll gesture, for example.

Referring to FIG. 24B, in response to input of the screen switch command, such as the scroll gesture, for example, the electronic device 2400 may display a wallpaper 2420 included in a menu screen at a relatively dark brightness compared to a brightness of the wallpaper 2410. Because the electronic device 2400 displays the wallpaper 2420 to be relatively dark, the user may readily identify an icon. Displaying the wallpaper 2420 at a relatively dark brightness compared to an existing brightness is an example. Therefore, a variety of visual effects to help the user identify an icon may be employed, such as displaying the wallpaper 2420 by applying a blurring effect, for example.

When the screen switch command is completed, the electronic device 2400 may switch the wallpaper 2420 displayed to be relatively dark to the wallpaper 2410 and may display the wallpaper 2410 at a normal brightness.

Figure 25:
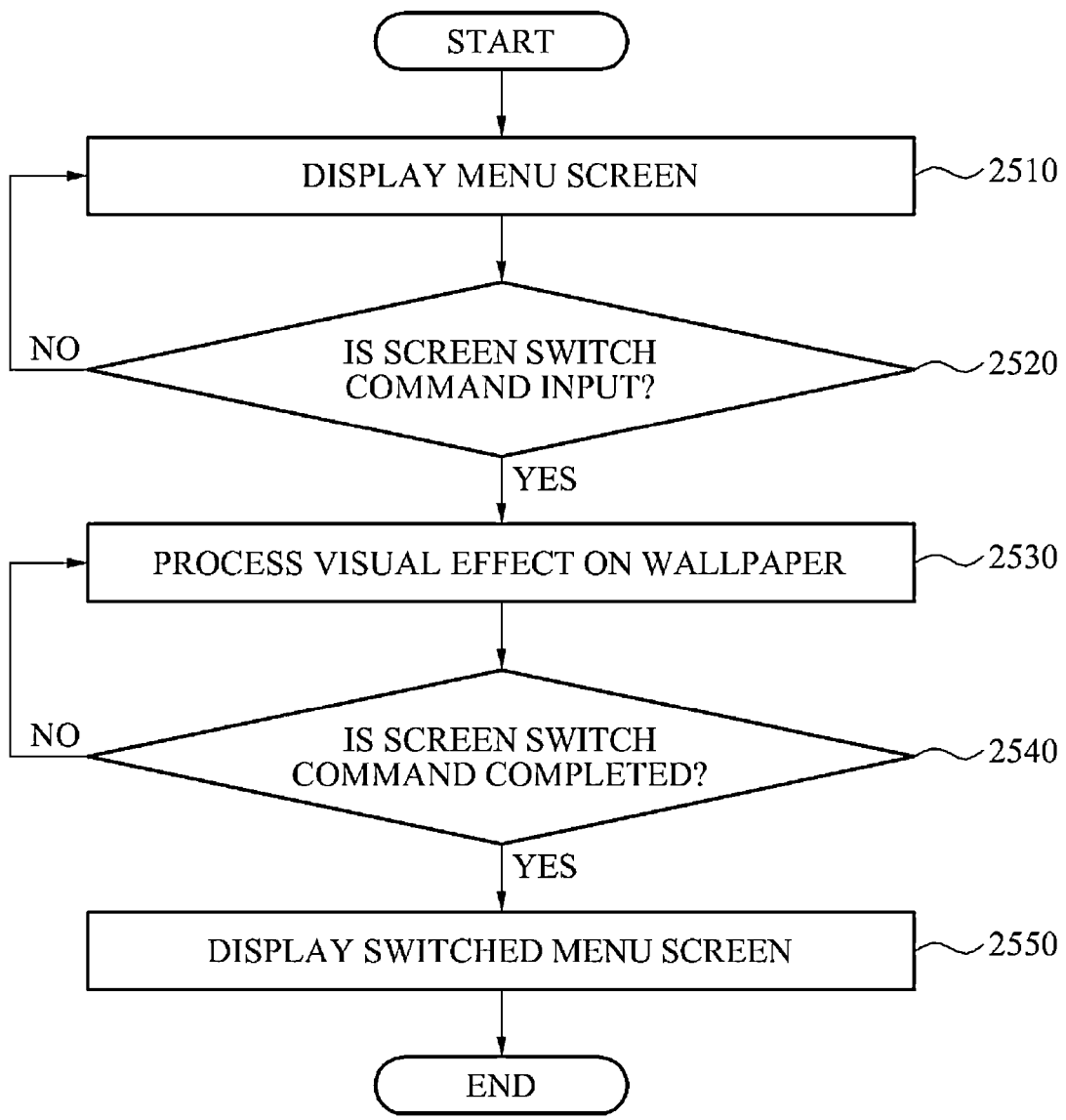
FIG. 25 is a flowchart illustrating a method of controlling an electronic device according to example embodiments.

FIG. 25 is a flowchart illustrating a method of controlling an electronic device according to example embodiments.

In operation 2510, the electronic device may display a menu screen. Here, the menu screen may include a first wallpaper and an icon.

In operation 2520, the electronic device may determine whether a screen switch command is input from an outside of the electronic device. For example, the electronic device may determine whether the screen switch command is input depending on whether a scroll gesture on a touch screen is input from the outside of the electronic device.

In operation 2530, when the screen switch command is input, the electronic device may display a second wallpaper acquired by processing a visual effect on a first wallpaper of the menu screen. In detail, the electronic device may display a menu screen including an icon disposed on the second wallpaper. Here, the second wallpaper may be displayed to be relatively dark compared to the first wallpaper. Alternatively, the second wallpaper may be acquired by blurring the first wallpaper.

In operation 2540, the electronic device may determine whether the screen switch command is completed. For example, when a new screen switch command is not input within a predetermined period of time after a point in time at which a most recent screen switch command is input, the electronic device may determine that the screen switch command is completed.

In operation 2550, when the screen switch command is determined to be completed, the electronic device may display the switched menu screen. The switched menu screen may include the first wallpaper and an icon disposed on the first wallpaper.

Figure 26A:
FIGS. 26A and 26B illustrate examples of a screen of an electronic device according to example embodiments.
Figure 26B:
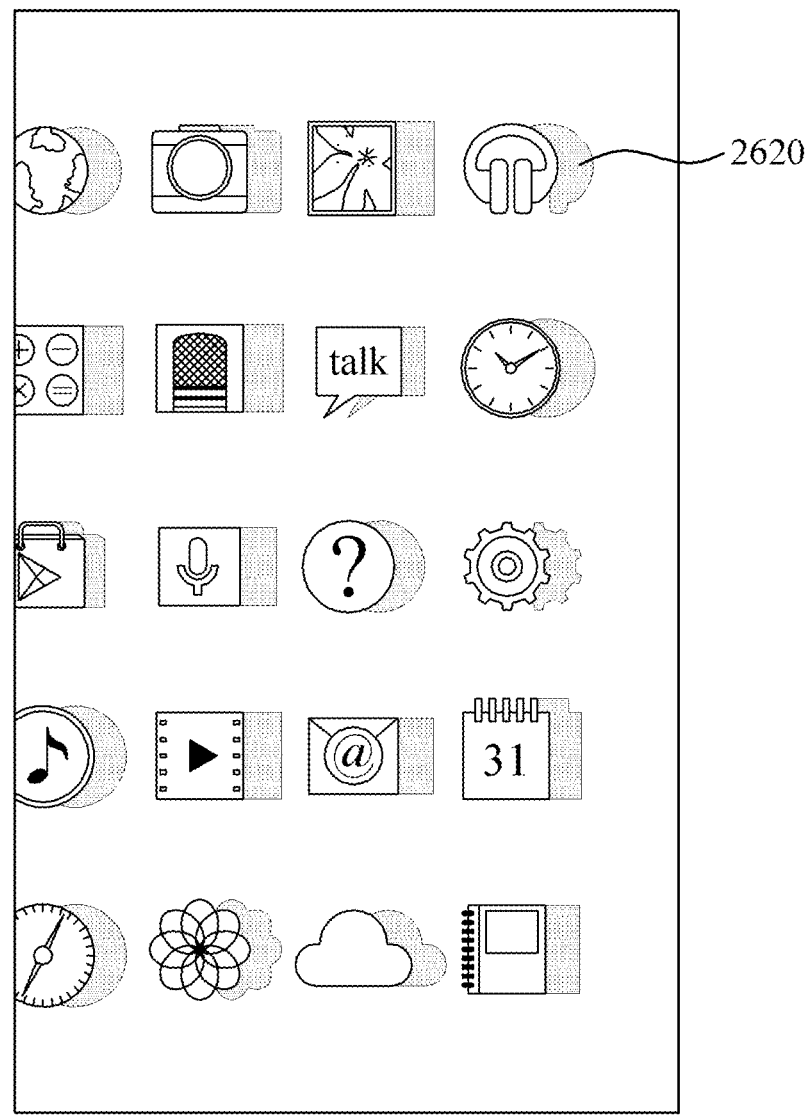

FIGS. 26A and 26B illustrate examples of a screen of an electronic device according to example embodiments.

FIGS. 26A and 26B illustrate examples of an electronic device switching a screen. As described above, the electronic device may display a wallpaper by processing a predetermined visual effect on the wallpaper while switching a screen. Additionally, the electronic device may apply the visual effect on an icon. For example, during a screen switch, the electronic device may process a spotlight effect 2610 on an icon having a relatively high use frequency and may display the spotlighted icon. Alternatively, referring to FIG. 26B, during a screen switch, the electronic device may process a blurring effect 2620 on the icon in a predetermined direction.

The units described herein may be implemented using hardware components and software components. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A method of controlling an electronic device, the method comprising:
   displaying a three-dimensional (3D) virtual space comprising a 3D object;
   receiving a correspondence command to make a two-dimensional (2D) icon for executing an application and the 3D object correspond to each other;
   assigning an attribute of the 2D icon to the 3D object;
   indicating the attribute of the 2D icon is assigned by modifying the 3D object; and
   determining when the 3D object designation is made and executing the application corresponding to the determination in the 3D virtual space.

2. The method of claim 1, wherein the receiving of the correspondence command comprises:
   verifying a correspondence relationship between the 2D icon and the 3D object; and
   displaying whether an input of the correspondence command is possible based on the correspondence relationship.

3. The method of claim 2, wherein the indicating comprises displaying a graphics effect of the 3D object when the 2D icon corresponds to the 3D object.

4. The method of claim 1, further comprising:
   displaying an application storage screen comprising the 2D icon together with the 3D virtual space.

5. The method of claim 4, wherein the correspondence command is a drag-and-drop gesture from the 2D icon comprised in the application storage screen to the first object.

6. The method of claim 1, further comprising:
   generating a user setting area comprising the 3D object on the 3D virtual space.

7. The method of claim 6, further comprising:
   providing a navigating user interface on the 3D virtual space for setting the user setting area.

8. The method of claim 7, further comprising:
   storing the user setting area in a predetermined order.

9. The method of claim 8, further comprising:
   receiving a movement command to move between user setting areas; and moving between user setting areas and displaying each user setting area in response to the movement command and in the predetermined order.

10. The method of claim 1, further comprising editing the 3D object by:
separating and displaying an addable 3D object from the 3D virtual space;
receiving a movement command to a first point on the 3D virtual space from the addable 3D object; and
displaying the addable 3D object at the 3D point.

11. The method of claim 1, wherein the 3D object is a secure 3D storage object in which a 2D icon is securely stored.

12. The method of claim 11, further comprising:
displaying a security cancel user interface when the secure 3D storage object is designated; and
displaying the securely stored 2D icon in response to a security cancel command that is input using the security cancel user interface.

13. The method of claim 1, further comprising:
displaying the 3D object by applying a visual effect thereto in correspondence to a 3D light source positioned on the 3D virtual space.

14. The method of claim 13, further comprising:
positioning the 3D light source based on 3D light source information.

15. The method of claim 14, wherein the positioning of the 3D light source comprises determining a position of the 3D light source from one of a wallpaper, actual illumination information, and a current time.

16. The method of claim 13, further comprising:
changing a position of the 3D light source; and
displaying the 3D object by applying the visual effect thereto based on the changed position.

17. The method of claim 1, further comprising displaying a connection probability in response to the 2D icon being placed on the 3D object.

18. The method of claim 1, further comprising changing a display width of the 3D virtual space in response to determining whether a gesture is a pinch-in gesture or a pinch-out gesture.

19. The method of claim 18, wherein in response to the gesture being a pinch-out gesture, changing the display width to be narrower, and in response to the gesture being a pinch-in gesture, changing the display width to be wider.

20. An electronic device, comprising:
a display unit configured to display a three-dimensional (3D) virtual space comprising a 3D object;
a input unit configured to receive a correspondence command to make a two-dimensional (2D) icon for executing an application correspond to the 3D object; and
a controller configured to:
assign an attribute of the 2D icon to the 3D object and indicate the attribute of the 2D icon is assigned by modifying the 3D object, and
determine when the 3D object designation is made and execute the application corresponding to the determination in the 3D virtual space.

21. The method of claim 20, wherein the controller is further configured to change a display width of the 3D virtual space in response to determining whether a gesture is a pinch-in gesture or a pinch-out gesture.

22. A method comprising:
displaying a three-dimensional (3D) virtual space comprising a 3D object;
displaying a two-dimensional (2D) icon comprising a function;
receiving a command to associate the 2D icon with the 3D object;
mapping, by a processor, the function of the 2D icon to the 3D object;
indicating the 2D icon is associated by modifying the 3D object; and
executing the application corresponding to the 2D icon in the 3D virtual space.

23. A non-transitory computer-readable recording medium storing a program to implement the method of claim 22.

* * * * *